(12) United States Patent
Hiller

(10) Patent No.: US 12,523,775 B2
(45) Date of Patent: Jan. 13, 2026

(54) AIRCRAFT ACCELERATION PREDICTION USING LIDAR TRAINED ARTIFICIAL INTELLIGENCE

(71) Applicant: The Boeing Company, Arlington, VA (US)

(72) Inventor: Nathan D. Hiller, Irvine, CA (US)

(73) Assignee: The Boeing Company, Arlington, VA (US)

( * ) Notice: Subject to any disclaimer, the term of this patent is extended or adjusted under 35 U.S.C. 154(b) by 285 days.

(21) Appl. No.: 18/496,586

(22) Filed: Oct. 27, 2023

(65) Prior Publication Data
US 2025/0138194 A1 May 1, 2025

(51) Int. Cl.
| | | |
|---|---|---|
| *G01S 17/95* | (2006.01) | |
| *G01W 1/00* | (2006.01) | |
| *G05D 1/00* | (2024.01) | |
| *G08G 5/76* | (2025.01) | |

(52) U.S. Cl.
CPC ............ *G01S 17/95* (2013.01); *G05D 1/0204* (2013.01); *G08G 5/76* (2025.01); *G01W 2001/003* (2013.01)

(58) Field of Classification Search
CPC ....... G01S 17/95; G01S 17/58; G05D 1/0204; G05D 1/242; G05D 2105/22; G05D 2107/13; G05D 2109/22; G05D 2111/17; G08G 5/76; G01W 2001/003
See application file for complete search history.

(56) References Cited

U.S. PATENT DOCUMENTS

| | | | | |
|---|---|---|---|---|
| 3,856,402 A | * | 12/1974 | Low | G01S 17/95 356/28 |
| 4,155,525 A | * | 5/1979 | Peter-Contesse | G05D 1/063 701/3 |
| 4,195,931 A | * | 4/1980 | Hara | G01J 3/26 356/519 |
| 4,875,770 A | * | 10/1989 | Rogers | G01S 17/95 356/28 |
| 5,173,704 A | * | 12/1992 | Buehler | G01S 13/003 342/26 D |
| 5,940,523 A | * | 8/1999 | Cornman | G01S 13/95 342/171 |
| 6,000,285 A | * | 12/1999 | Leslie | G01S 11/02 73/178 R |
| 6,184,816 B1 | * | 2/2001 | Zheng | G01S 7/003 340/963 |
| 6,307,500 B1 | * | 10/2001 | Cornman | G01S 13/951 702/3 |

(Continued)

*Primary Examiner* — Bhavesh V Amin
(74) *Attorney, Agent, or Firm* — Yee & Associates, P.C.

(57) ABSTRACT

An air vehicle management system comprising a controller for an air vehicle. The controller is configured to determine a prediction of an acceleration using an air vehicle model system and backscatter data. The air vehicle model system is trained to predict the acceleration using the backscatter data and is generated using backscatter light detected from emitting a laser beam in an atmosphere in a direction ahead of the air vehicle. The controller is configured to determine an adjustment to a number of flight control settings for the air vehicle that reduces a stress on the air vehicle using the prediction of the acceleration. The controller is configured to adjust the number of flight control settings using the adjustment.

33 Claims, 14 Drawing Sheets

(56) References Cited

U.S. PATENT DOCUMENTS

| | | | | |
|---|---|---|---|---|
| 6,456,226 B1* | 9/2002 | Zheng | G01S 13/87 | 340/963 |
| 6,563,452 B1* | 5/2003 | Zheng | G01S 7/06 | 342/52 |
| 6,751,532 B2* | 6/2004 | Inokuchi | G01S 17/95 | 701/13 |
| 6,828,923 B2* | 12/2004 | Anderson | G01P 5/001 | 342/26 B |
| 6,871,816 B2* | 3/2005 | Nugent | B64C 13/16 | 356/342 |
| 7,069,147 B2* | 6/2006 | Manfred | G01W 1/10 | 340/971 |
| 7,400,293 B2* | 7/2008 | Fleming | G01S 19/14 | 342/357.52 |
| 7,592,955 B2* | 9/2009 | Tillotson | G01W 1/02 | 342/378 |
| 7,598,901 B2* | 10/2009 | Tillotson | G01P 5/001 | 342/26 B |
| 7,889,328 B2* | 2/2011 | Tillotson | G01P 5/26 | 356/28 |
| 7,933,002 B2* | 4/2011 | Halldorsson | G01P 5/26 | 356/28 |
| 8,130,121 B2* | 3/2012 | Smith | G08G 5/21 | 340/963 |
| 8,209,071 B2* | 6/2012 | Ross | G08G 5/26 | 701/14 |
| 8,320,630 B2* | 11/2012 | Tillotson | G06T 7/285 | 382/107 |
| 8,339,583 B2* | 12/2012 | Tillotson | G01N 21/41 | 701/472 |
| 8,508,721 B2* | 8/2013 | Cates | G01P 3/366 | 356/3.01 |
| 8,509,966 B2* | 8/2013 | Coulmeau | G01C 23/00 | 73/170.16 |
| 8,724,099 B2* | 5/2014 | Asahara | G01S 17/95 | 356/73 |
| 8,774,987 B2* | 7/2014 | Walton | G05D 1/046 | 701/4 |
| 8,965,699 B2* | 2/2015 | McDonald | G01W 1/00 | 702/3 |
| 9,068,884 B1* | 6/2015 | Tillotson | G06T 7/285 | |
| 9,070,284 B2* | 6/2015 | Inokuchi | G08G 5/34 | |
| 9,097,799 B2* | 8/2015 | Inokuchi | G01S 17/95 | |
| 9,116,243 B1* | 8/2015 | Brown | G01S 17/18 | |
| 9,223,020 B1* | 12/2015 | Crosmer | G01S 13/953 | |
| 9,243,922 B2* | 1/2016 | Watts | G01C 21/3407 | |
| 9,483,951 B1* | 11/2016 | McCusker | B64D 43/00 | |
| 9,736,433 B2* | 8/2017 | Tillotson | G01W 1/10 | |
| 9,881,507 B2* | 1/2018 | Rencher | G08G 5/55 | |
| 9,889,926 B2* | 2/2018 | Mayo | B64C 13/16 | |
| 9,924,138 B1* | 3/2018 | Brown | G06V 10/431 | |
| 10,017,272 B1* | 7/2018 | Olivo | G08C 17/02 | |
| 10,055,998 B1* | 8/2018 | Reinke | G08G 5/26 | |
| 10,101,719 B1* | 10/2018 | Kroo | G05B 17/02 | |
| 10,184,841 B1* | 1/2019 | Englert | G01J 9/02 | |
| 10,656,084 B2* | 5/2020 | Ray | G01S 17/04 | |
| 10,701,287 B1* | 6/2020 | Brown | G01N 21/538 | |
| 10,962,474 B2* | 3/2021 | Talghader | G01P 5/26 | |
| 11,046,430 B1* | 6/2021 | Melton | G08G 5/76 | |
| 11,050,954 B1* | 6/2021 | Brown | G01N 21/41 | |
| 11,060,870 B2* | 7/2021 | Bhan | G01C 21/16 | |
| 11,430,344 B2* | 8/2022 | Reid | G08G 5/20 | |
| 11,686,742 B2* | 6/2023 | Naslund | G01P 5/26 | 356/28 |
| 11,827,337 B2* | 11/2023 | Inokuchi | G01P 5/26 | |
| 11,851,193 B2* | 12/2023 | Sly | B64D 43/02 | |
| 12,174,217 B2* | 12/2024 | Tucker | G01S 17/89 | |
| 2003/0009268 A1* | 1/2003 | Inokuchi | G01S 17/58 | 701/14 |
| 2003/0222795 A1* | 12/2003 | Holforty | B64D 43/00 | 340/968 |
| 2005/0045761 A1* | 3/2005 | Nugent | G05D 1/0615 | 244/3.16 |
| 2005/0278120 A1* | 12/2005 | Manfred | G01W 1/08 | 702/2 |
| 2006/0121893 A1* | 6/2006 | Tillotson | G01S 13/955 | 455/431 |
| 2007/0069941 A1* | 3/2007 | Pearlman | G01S 7/003 | 342/26 B |
| 2007/0077071 A1* | 4/2007 | Belenkiy | G01S 17/95 | 398/130 |
| 2007/0159383 A1* | 7/2007 | Fleming | G01S 19/14 | 342/357.52 |
| 2007/0171397 A1* | 7/2007 | Halldorsson | G01S 7/497 | 356/28 |
| 2007/0256491 A1* | 11/2007 | Tillotson | G01N 29/262 | 73/170.13 |
| 2008/0043234 A1* | 2/2008 | Mirand | G01S 17/95 | 356/342 |
| 2008/0119971 A1* | 5/2008 | Deker | G01W 1/10 | 701/14 |
| 2008/0255714 A1* | 10/2008 | Ross | G01W 1/10 | 701/14 |
| 2009/0048723 A1* | 2/2009 | Nugent | G05D 1/0615 | 701/10 |
| 2009/0143988 A1* | 6/2009 | Tillotson | G01P 5/26 | 342/26 B |
| 2009/0157239 A1* | 6/2009 | Walton | G05D 1/046 | 701/4 |
| 2009/0310118 A1* | 12/2009 | Halldorsson | G01P 5/26 | 356/28 |
| 2010/0171002 A1* | 7/2010 | Hahn | G05D 1/0816 | 244/76 C |
| 2010/0315265 A1* | 12/2010 | Smith | G01W 1/00 | 340/963 |
| 2011/0013016 A1* | 1/2011 | Tillotson | G01W 1/00 | 340/963 |
| 2011/0134412 A1* | 6/2011 | Inokuchi | G01S 17/95 | 356/28.5 |
| 2011/0164783 A1* | 7/2011 | Hays | G01S 17/003 | 356/519 |
| 2011/0222048 A1* | 9/2011 | Englert | G01S 17/95 | 356/28.5 |
| 2011/0257818 A1* | 10/2011 | Ganz | G08G 5/21 | 701/14 |
| 2011/0299062 A1* | 12/2011 | Jenaro Rabadan | G01S 17/58 | 356/28.5 |
| 2012/0092645 A1* | 4/2012 | Inokuchi | G01S 17/58 | 356/28.5 |
| 2012/0101747 A1* | 4/2012 | Kielkopf | G01M 3/38 | 702/50 |
| 2012/0259549 A1* | 10/2012 | McDonald | G01W 1/00 | 702/3 |
| 2013/0166113 A1* | 6/2013 | Dakin | G01P 13/025 | 356/28 |
| 2014/0074326 A1* | 3/2014 | Pereira | G01C 21/10 | 701/14 |
| 2014/0379263 A1* | 12/2014 | Ray | G01S 17/95 | 702/3 |
| 2015/0019185 A1* | 1/2015 | Cunningham | G06F 30/20 | 703/6 |
| 2016/0202283 A1* | 7/2016 | Wang | G01S 7/4814 | 356/28 |
| 2017/0144748 A1* | 5/2017 | Mayo | B64C 13/506 | |
| 2017/0168161 A1* | 6/2017 | Shapira | G06F 16/50 | |
| 2017/0248700 A1* | 8/2017 | Lodden | G01P 21/025 | |
| 2017/0334576 A1* | 11/2017 | Shams | B64D 43/00 | |
| 2020/0013300 A1* | 1/2020 | Reid | G08G 5/76 | |
| 2020/0172116 A1* | 6/2020 | Zhu | B60W 40/1005 | |
| 2021/0055111 A1* | 2/2021 | Bhan | B64G 1/24 | |
| 2021/0063429 A1* | 3/2021 | Tucker | G08G 5/55 | |
| 2021/0179101 A1* | 6/2021 | Zhu | B60W 60/001 | |
| 2021/0199685 A1* | 7/2021 | Tucker | G01S 17/95 | |
| 2023/0266768 A1* | 8/2023 | Li | G01S 7/40 | 701/98 |
| 2023/0294830 A1* | 9/2023 | Ordonez | B64D 1/22 | 701/3 |

(56) References Cited

U.S. PATENT DOCUMENTS

| | | | |
|---|---|---|---|
| 2023/0377466 A1* | 11/2023 | Hernandez | G08G 5/76 |
| 2025/0138194 A1* | 5/2025 | Hiller | G05D 1/0204 |
| 2025/0259553 A1* | 8/2025 | Mitchell | G01S 13/951 |

\* cited by examiner

AIRCRAFT ACCELERATION PREDICTION USING LIDAR TRAINED ARTIFICIAL INTELLIGENCE

BACKGROUND INFORMATION

1. Field

The present disclosure relates generally to aircraft and, in particular, to reducing aircraft effects of air turbulence.

2. Background

Air turbulence is the movement of air with chaotic or irregular changes in pressure and flow velocity. Air turbulence can be caused by different conditions in the atmosphere. Clear air turbulence is a turbulent movement of air masses and occurs when these air masses moving at different speeds and directions meet. This type of turbulence can be caused by jet streams for air masses moving at different speeds or in different directions. Mechanical turbulence can occur over terrain such as mountains or buildings disrupting airflow. Thermal turbulence can be caused by hot air rising and cool air descending.

An aircraft encountering air turbulence can experience unexpected changes in altitude and orientation. For example, changes in pitch, roll, and yaw can occur when an aircraft encounters air turbulence. Air turbulence encountered by aircraft can range from mild and barely noticeable to severe jolts.

Air turbulence can cause difficulty for pilots to maintain a particular course, altitude, or speed. Further, flying through air turbulence can also result in increased fuel consumption. Air turbulence can also cause annoyances or discomfort to passengers. In some cases, the level of air turbulence can cause unsecured objects in the passenger cabin to move and can also cause passenger injuries when passengers are not seated and wearing seatbelts.

SUMMARY

An embodiment of the present disclosure provides an air vehicle management system comprising a lidar system, an air vehicle model system, and a controller. The lidar system is located in an air vehicle. The lidar system is configured to emit a laser beam in an atmosphere in a direction ahead of the air vehicle. The lidar system is configured to receive a backscatter light generated in response to emitting the laser beam. The lidar system is configured to generate backscatter data using the backscatter light. The air vehicle model system is trained to predict an acceleration for the air vehicle using a current measurement of an acceleration and the backscatter data. The controller is configured to determine a prediction of the acceleration using the air vehicle model system, the current measurement of the acceleration and the backscatter data. The controller is configured to determine an adjustment to a number of flight control settings for the air vehicle that reduces a stress on the air vehicle using the prediction of the acceleration and adjust the number of flight control settings using the adjustment.

Yet another embodiment of the present disclosure provides an air vehicle management system comprising an air vehicle model and a controller. The air vehicle model is trained to predict a number of atmospheric states for the air vehicle using a current measurement of the number of atmospheric states. The controller is configured to determine a prediction of the number of atmospheric states using the air vehicle model and the current measurement of the number of atmospheric states. The controller is configured to determine an adjustment to a number of flight control settings for the air vehicle using the prediction of the number of atmospheric states. The controller is configured to adjust the number of flight control settings using the adjustment.

Another embodiment of the present disclosure provides an air vehicle management system comprising a controller for an air vehicle. The controller is configured to determine a prediction of an acceleration using an air vehicle model system, a current measurement of the acceleration and backscatter data generated using backscatter light detected from emitting a laser beam in an atmosphere in a direction ahead of the air vehicle. The air vehicle model system is trained to predict the acceleration using the current measurement of the acceleration and the backscatter data. The controller is configured to determine an adjustment to a number of flight control settings for the air vehicle that reduces a stress on the air vehicle using the prediction of the acceleration. The controller is configured to adjust the number of flight control settings using the adjustment.

Yet another embodiment of the present disclosure provides an air vehicle management system comprising a computer system and a model generator. The model generator is located in the computer system. The model generator is configured to create a training dataset comprising historical backscatter data generated by lidar systems in a number of air vehicles during a flight of the number of air vehicles and historical measurements of acceleration for the number of air vehicles during the flight of the number of air vehicles. The model generator is configured to train a machine learning model system using the training dataset to form an air vehicle model system that predicts the acceleration for an air vehicle using a current measurement of the acceleration of the air vehicle and the backscatter data generated by a lidar system in the air vehicle.

Another embodiment of the present disclosure provides a method for managing flight controls for an air vehicle. A prediction of an acceleration for the air vehicle is determined using an air vehicle model system and backscatter data generated using backscatter light detected from emitting the laser beam in the atmosphere in the direction ahead of the air vehicle. The air vehicle model system is trained to predict acceleration for the air vehicle using the backscatter data. An adjustment to a number of flight control settings for the air vehicle that reduces a stress on the air vehicle using the prediction of the acceleration is determined. The number of flight control settings is adjusted using the adjustment.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations as described herein. Currently, the effects of air turbulence can be reduced through route planning using weather forecasting. The effects can also be reduced from identifying jet streams. Flight weather forecasts obtained from weather forecasting can be used to predict areas of potential turbulence. The route of an aircraft can be adjusted to avoid storms and jet streams that are known to cause turbulence.

Altitude changes in a route can be used to avoid turbulence. Also, speed reduction can be used when turbulence is anticipated in a particular area. By reducing speed, stresses on the aircraft can be reduced when encountering turbulence. Although these types of mechanisms are useful, avoidance of clear air turbulence can be difficult because of an inability of pilots to see this clear turbulence. As a result, some of these actions cannot be taken because the aircraft encounters the air turbulence without knowing that the air turbulence is ahead of the aircraft.

Air turbulence results in undesired accelerations of the aircraft in different directions. For example, air turbulence can result in undesired accelerations of aircraft in a vertical direction. This air turbulence can cause stress on aircraft components leading to increased wear-and-tear. As a result, increased frequency in inspections may be needed. Further, the stress on aircraft caused by air turbulence can also result in airframe fatigue that reduces the longevity of an aircraft. The airframe can include, for example, the fuselage and wings of the aircraft. The airframe can also include the empennage and undercarriage of the aircraft. Additionally, flying through turbulent air can result in reduced fuel efficiency.

Thus, the illustrative examples provide a method, apparatus, system, and computer program product for predicting accelerations that can occur from air turbulence. In one illustrative example, an air vehicle management system comprises a controller for an air vehicle. The controller is configured to determine a prediction of an acceleration using an air vehicle model system, a current measurement of backscatter data generated using backscatter light detected from emitting a laser beam in an atmosphere in a direction ahead of the air vehicle. The air vehicle model system is trained to predict the acceleration using the backscatter data. The controller is configured to determine an adjustment to a number of flight control settings for the air vehicle that reduces a stress on the air vehicle using the prediction of the acceleration. The controller is configured to adjust the number of flight control settings using the adjustment.

As used herein, a "number of" when used with reference items means one or more items. For example, a number of flight control settings is one or more flight control settings.

Figure 1:
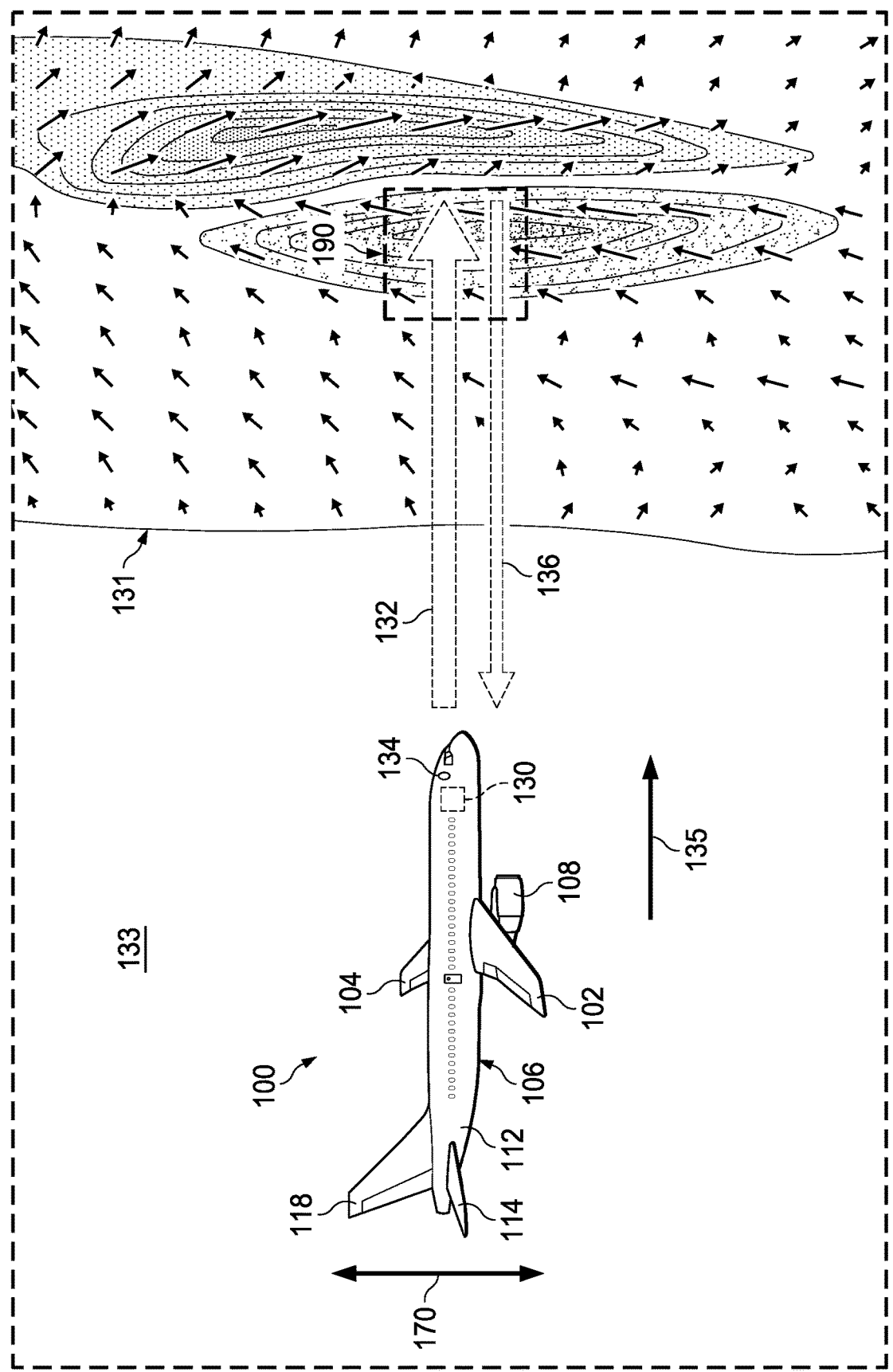
FIG. 1 is an illustration of an aircraft in a turbulent environment in accordance with an illustrative embodiment.

With reference now to the figures and, in particular, with reference to FIG. 1, an illustration of an aircraft in a turbulent environment is depicted in accordance with an illustrative embodiment. In this illustrative example, commercial airplane 100 has wing 102 and wing 104 attached to body 106. Engine 108 is attached to wing 102. In this view of commercial airplane 100, another engine attached to wing 104 but not seen in this view.

Body 106 has tail section 112. Horizontal stabilizer 114 and vertical stabilizer 118 are attached to tail section 112 of body 106. Another horizontal stabilizer is present but not shown in this view.

Commercial airplane 100 is an example of an air vehicle in which air vehicle management system 130 can be implemented in accordance with an illustrative embodiment. In this illustrative example, air vehicle management system 130 operates to predict the presence of clear air turbulence 131, which cannot be seen by the pilot of commercial airplane 100.

Further, air vehicle management system 130 can also operate to manage the operation of commercial airplane 100 to at least one of reduce the effects of clear air turbulence 131 or increase the engine performance of commercial airplane 100 to increase fuel efficiency. As result, at least one of reducing stresses on the airframe or reducing emissions of greenhouse gases can occur. Further, air vehicle management system 130 can operate to increase passenger comfort and safety.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

The reduction in stress on an aircraft component such as the airframe of commercial airplane 100 can be made by adjusting at least one of flight control surface configurations or engine operation in a manner that reduces the stress on commercial airplane 100 during flight of commercial airplane 100. The stress can be reduced by reducing the predicted acceleration or reducing the effects of the predicted acceleration.

With the reduction of stresses on the airframe and other components of commercial airplane 100, the lifecycle for commercial airplane 100 can be increased. Further, in the designing of new air vehicles such as commercial airplane 100, lighter airframes can be used to obtain the same lifecycle with the use of air vehicle management system 130.

As a result, multiple benefits can occur with the use of air vehicle management system 130. Increased lifecycle and reduced greenhouse emissions can be achieved for commercial airplane 100. Greenhouse gases can also be reduced through the production of aircraft with a lighter airframe, from reducing material usage of processing in manufacturing a lighter airframe as compared to current airframes having a heavier weight. Further, future aircraft can be designed to use lighter airframes which also increases fuel efficiency that results in lower greenhouse gases.

In this illustrative example, air vehicle management system 130 operates to emit laser beam 132 from port 134 of commercial airplane 100. As depicted, laser beam 132 is emitted in forward direction 135 relative to commercial airplane 100. This forward direction is relative to the direction of travel of commercial airplane 100 during flight.

In this depicted example, air vehicle management system 130 receives backscatter light 136 generated in response to emitting laser beam 132. In this example, laser beam 132 is emitted into atmosphere 133 into clear air turbulence 131. Backscatter light 136 is received in response to emitting laser beam 132 and is used in this example to manage the operation of commercial airplane 100.

For example, air vehicle management system 130 generates backscatter data from backscatter light 136. Backscatter data can be used to predict acceleration 170 of commercial airplane 100. In this example, acceleration 170 is a vertical acceleration for commercial airplane 100. In this example, the prediction can be that commercial airplane 100 encounters changes in acceleration 170 caused by clear air turbulence 131. This prediction can be made using the backscatter data generated from backscatter light 136 and a current measurement of acceleration 170.

In this illustrative example, Rayleigh scattering in backscatter light 136 can be used to generate backscatter data. Rayleigh scattering is scattering of laser beam 132 by particles much smaller than the light's wavelength. In these examples, the scattering is of air molecules.

Rayleigh scattering is used to generate backscatter data in the form of changes in air density in the atmosphere 133 at a distance ahead of commercial airplane 100. This type of backscatter data can also be referred to as air density fluctuations.

In another illustrative example, Mie scattering in backscatter light 136 can be used in another illustrative example to generate backscatter data. This type of backscatter involves scattering of the laser beam by particles about the same size as or larger than the light's wavelength. This type of backscattering can occur from aerosols. These aerosols can be a suspension of particles or droplets in atmosphere 133.

The prediction of acceleration 170 can be acceleration 170 that will be detected in the future. The prediction can be for acceleration 170 caused by clear air turbulence 131 that is ahead of commercial airplane 100. In a similar fashion, the prediction can be made for environmental parameters that will be present in the future. For example, the prediction can be for 5 seconds, 10 seconds, 25 seconds, or some other time in the future from the present values of acceleration and the number of environmental parameters.

In this example, air vehicle management system 130 predicts that acceleration 170 will increase in 15 seconds when commercial airplane reaches region 190 in clear air turbulence 131 when air vehicle management system 130 can receive a current measurement of acceleration.

In this case, air vehicle management system 130 can determine an adjustment to a number of flight controls in commercial airplane 100 to reduce acceleration 170 that is predicted to occur. For example, the control surfaces of commercial airplane 100 can be configured during flight to cause commercial airplane 100 to have an increased angle of attack and engines of commercial airplane 100 can be adjusted to reduce the speed of commercial airplane 100. Changing the flight control settings can reduce acceleration 170 actually encountered by commercial airplane 100 as compared to the prediction of acceleration 170 without the adjustment to these flight control settings.

As a result, stress on commercial airplane 100 can be reduced. Further, this adjustment can also reduce fuel usage, which results in an additional benefit of reducing the emission of greenhouse gases that would otherwise occur without changes to the flight control settings.

Thus, air vehicle management system 130 can operate to provide real time adjustments to flight control settings during the flight of commercial airplane 100 that can reduce the effects of clear air turbulence 131 or other turbulence in atmosphere 133 as compared to current techniques. Current techniques can forecast predictions of weather conditions that may result in clear air turbulence. However, these techniques do not enable commercial airplane 100 to make adjustments to reduce the effects of turbulence that may be directly ahead of the path of the commercial airplane 100 during flight.

In another illustrative example, air vehicle management system 130 can also predict environmental parameters that affect the performance of engine 108 and engine 110. With this example, the backscatter data can also be used to predict a number of environmental parameters that affect engine performance. As used herein, a "number of" when used with reference to items means one or more items. For example, a number of environmental parameters is one or more environmental parameters. The prediction of these parameters can be used to manage flight control settings to increase fuel efficiency.

This number of environmental parameters can include, at least one of temperature, pressure, density, humidity, or other environmental parameters for the atmosphere that can affect the performance of engines for commercial airplane 100. With predicting these parameters, air vehicle management system 130 determines a change or adjustment to one or more flight control settings for commercial airplane 100. The settings can be selected to increase the engine performance of the engines for commercial airplane 100. Engine performance can be increased to reduce fuel usage, resulting in lower greenhouse gas emissions from commercial airplane 100. As a result, air vehicle management system 130 can be used to at least one of reduce the effects of turbulence or to reduce the emission of greenhouse gases, even in the absence of turbulence.

Thus, air vehicle management system 130 can operate to manage flight control settings for commercial airplane 100 by predicting acceleration 170 using backscatter light 136. This prediction using air vehicle management system 130 is performed to manage the flight of commercial airplane 100 in real time as backscatter light 136 is received. In this example, real time means that operations or steps are performed as quickly as possible without intentional delay. This prediction can be made much faster as compared to a pilot or other person performing an analysis to make the predictions such as those made by air vehicle management system 130. A human operator cannot practically perform these operations in real time to manage the flight of commercial airplane 100.

FIG. 1 is intended as an example and not as an architectural limitation for the different illustrative embodiments. For example, laser beam 132 can be embedded from other locations other than port 134 in body 106. In another illustrative example, laser beam 132 can be emitted from a port located in wing 104, horizontal stabilizer 114, vertical stabilizer 118, or other suitable locations.

As another example, other information can be used in addition to or in place of backscatter to determine acceleration of commercial airplane 100 that can be caused by air turbulence. For example, measurements of at least one of acceleration or a number of environmental parameters can be used in addition to or in place of backscatter data to predict acceleration.

Figure 2:
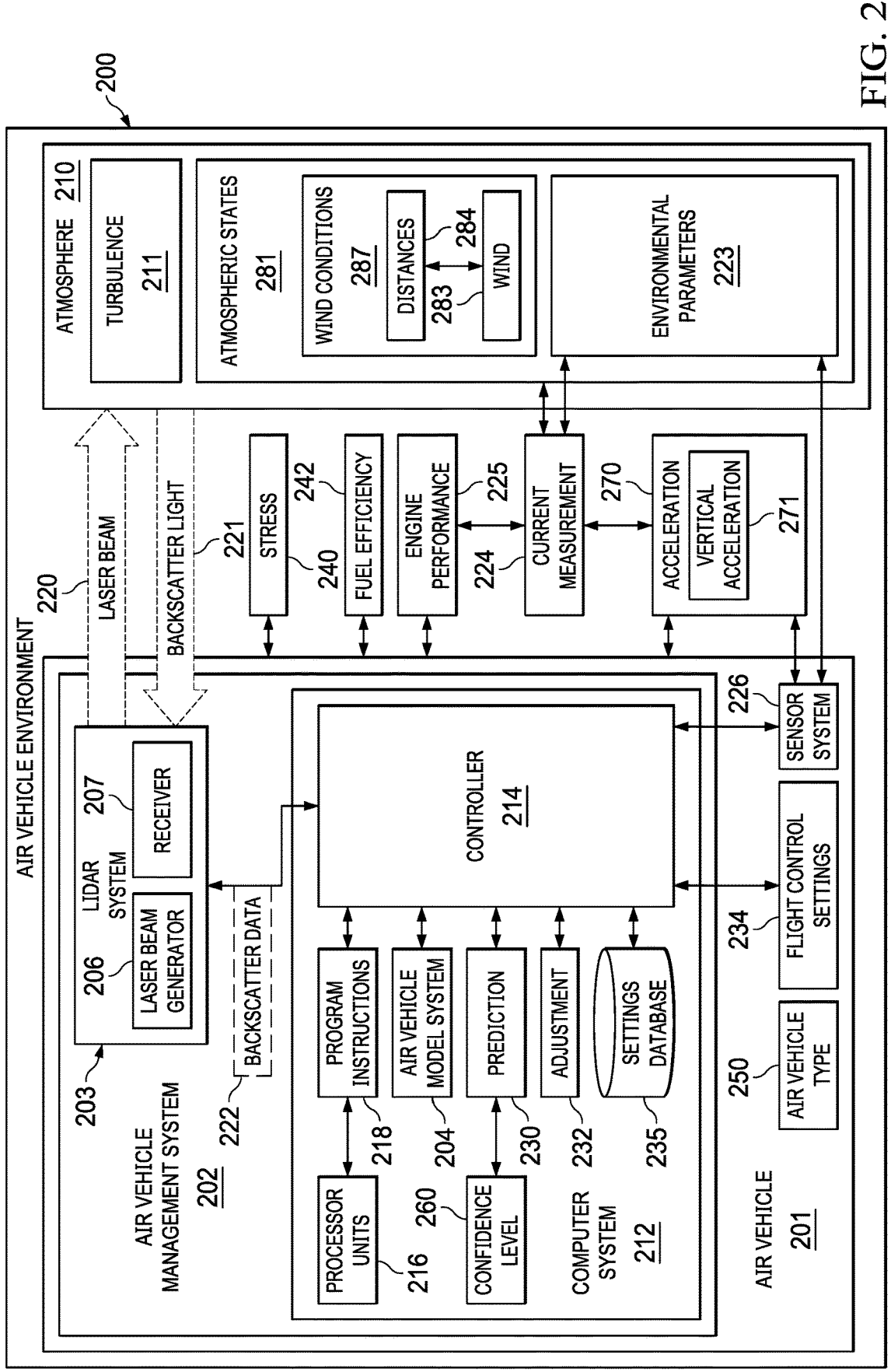
FIG. 2 is an illustration of a block diagram of an air vehicle management environment in accordance with an illustrative embodiment.

With reference now to FIG. 2, an illustration of a block diagram of an air vehicle management environment is depicted in accordance with an illustrative embodiment. In the illustrative example, air vehicle management system 202 in air vehicle environment 200 operates to manage the operation of air vehicle 201. Air vehicle management system 130 in FIG. 1 is an example of an implementation of air vehicle management system 202.

In this example, air vehicle 201 can take a number different forms. For example, air vehicle 201 can be selected from a group comprising an aircraft, a commercial airplane, a cargo airplane, a tilt-rotor aircraft, a tilt wing aircraft, a vertical takeoff and landing aircraft, a rotorcraft, an unmanned aerial vehicle, a drone, an electric vertical takeoff and landing vehicle, a personal air vehicle, a spaceplane, a rocket, and other types of vehicles that can fly in atmosphere 210.

In some examples, air vehicle 201 can also operate in other environments such as outer space. In this case, the backscatter light is generated in response to the laser beam encountering space dust.

In this illustrative example, air vehicle management system 202 is located in air vehicle 201. As depicted, air vehicle management system 202 comprises lidar system 203, computer system 212, air vehicle model system 204, and controller 214. In this example, air vehicle model system 204 and controller 214 are located in computer system 212. In this example, lidar system 203 is also referred to as a light detection and ranging (lidar) system.

Lidar system 203 is a hardware system and can include software. In this example, lidar system 203 includes laser beam generator 206 and receiver 207.

Lidar system 203 emits laser beam 220 in atmosphere 210 in a direction ahead of air vehicle 201 using laser beam generator 206. Laser beam generator 206 is a hardware component that is configured to emit laser beam 220 into atmosphere 210 in a direction ahead of air vehicle 201. In this example, the direction ahead of air vehicle 201 is a direction in which air vehicle 201 is traveling. Laser beam generator 206 controls characteristics of laser beam 220. These characteristics can include at least one of a wavelength, power, timing, and other characteristics.

In this example, lidar system 203 is configured to receive backscatter light 221 in response to emitting laser beam 220. In this example, backscatter light 221 is received by receiver 207 in lidar system 203. Receiver 207 is also a hardware component and includes sensors in at least one of electronics or computers. Lidar system 203 generates backscatter data 222 using receiver 207. Backscatter data 222 is sent to controller 214 for processing.

Further, in this example, air vehicle model system 204 is a software component that has been trained to predict acceleration 270 for air vehicle 201. Air vehicle model system 204 is comprised of a number of air vehicle models.

Air vehicle model system 204 can predict vertical acceleration 271 for air vehicle 201. In other examples, other components of acceleration 270 can also be predicted such as horizontal acceleration, lateral acceleration, angular acceleration, and other types of acceleration. For example, air vehicle model system 204 is trained to predict acceleration 270 for air vehicle 201 using current measurement 224 of acceleration 270 and backscatter data 222.

In this depicted example, current measurement 224 of acceleration 270 can be made using sensor system 226 in air vehicle 201. For example, sensor system 226 is a hardware system and can include software. Sensor system 226 includes one or more sensors selected from at least one of an accelerometer, a gyroscope, a strain gauge, a global positioning system sensor, or other types of sensors.

Acceleration 270 can indicate the presence of turbulence 211 in atmosphere 210. In this example, prediction 230 of acceleration 270 at a future point in time by controller 214 can be used to predict the presence of turbulent conditions ahead of air vehicle 201. These conditions can be at least one of air turbulence, clear air turbulence, thermal turbulence, temperature inversion turbulence, mechanical turbulence, frontal turbulence, mountain wave turbulence, thunderstorm turbulence, updrafts, downdrafts, or other conditions in atmosphere 210. These different conditions can result in acceleration 270 that can change at least one of fuel efficiency 242 or stress 240 in air vehicle 201.

In this illustrative example, controller 214 can be implemented in software, hardware, firmware, or a combination thereof. When software is used, the operations performed by controller 214 can be implemented in program instructions configured to run on hardware, such as a processor unit. When firmware is used, the operations performed by controller 214 can be implemented in program instructions and data and stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

As depicted, controller 214 determines prediction 230 of acceleration 270 using air vehicle model system 204, current measurement 224 of acceleration 270 and backscatter data 222. In this example, current measurement 224 of acceleration 270 and backscatter data 222 are inputs to air vehicle model system 204.

In this illustrative example, prediction 230 of acceleration 270 is a prediction of acceleration 270 that air vehicle 201 will encounter or experience at a future point in time. For example, prediction 230 can be for acceleration 270 that will occur in 5 seconds, 15 seconds, 25 seconds, or some other period of time in the future. In this example, prediction 230 of acceleration 270 is for acceleration 270 that occurs in response to air vehicle 201 encountering turbulence 211 in atmosphere 210.

Controller 214 determines adjustment 232 to a number of flight control settings 234 for air vehicle 201 that reduces stress 240 on air vehicle 201 using prediction 230 of acceleration 270. The number of flight control settings 234 can take a number different forms. For example, the number of flight control settings 234 can be selected from at least one of an engine setting, an engine power output, an angle of attack, an amount of thrust setting, a throttle setting, a fuel flow rate, a flap position, air speed, an acceleration, or other flight control setting.

In this example, adjustment 232 for the number of flight control settings 234 can be determined using settings database 235. This database can include settings for one or more flight controls based on the different values of acceleration 270 predicted using air vehicle model system 204.

Controller 214 can adjust the number of flight control settings 234 using adjustment 232. In this example, by reducing stress 240, effects of turbulence 211 on air vehicle 201 can be reduced.

As another example, fuel efficiency can also be increased when flight control settings 234 for control surfaces are adjusted to perform ride smoothing or turbulence penetration. Ride smoothing involves reducing jolts, vibrations, or abrupt movements when encountering turbulence 211. By reducing acceleration 270 actually occurring from prediction 230 of acceleration 270 through adjustment 232, passenger comfort and safety can be increased. Ride smoothing can also reduce stress on air vehicle 201. This reduction in stress on air vehicle 201 can be referred to as gust alleviation.

Turbulent penetration involves reducing stress to air vehicle 201 as a primary concern as compared to passenger comfort. This type of adjustment can include adjusting an air speed, an altitude, or a course when flying through turbulence 211 in a manner that reduces stress on air vehicle 201. In this example, stress on air vehicle 201 can be reduced by reducing the actual acceleration from acceleration 270 as predicted for air vehicle 201 when encountering turbulence 211.

These types of adjustments can include adjusting control surfaces such as ailerons, elevators, and the rudder to counteract the effect of turbulence 211. With upward moving turbulence 211, a pilot can adjust the elevator to change the pitch of air vehicle 201 upward to reduce jolts and discomfort. This type of change can also reduce constant adjustments to the engines in air vehicle 201 to obtain a desired speed. This type of adjustment can reduce adjustments needed to throttle settings for the engine, increasing fuel efficiency as compared to constant adjustments to the engines.

Thus, controller 214 can make adjustment 232 to a number of flight control settings 234 in a manner that reduces acceleration 270 that is predicted for air vehicle 201 in prediction 230 of acceleration 270 generated using air vehicle model system 204. Thus, at least one of reducing stress or increasing fuel efficiency for air vehicle 201 can occur. Besides reducing costs from fuel usage, another benefit of increasing fuel efficiency is a reduction in greenhouse gas emissions.

In one illustrative example, in determining adjustment 232, controller 214 determines air vehicle type 250 for air vehicle 201. Air vehicle type 250 can be, for example, a passenger airplane, a freighter aircraft, a personal air vehicle, or some other type of air vehicle 201. Air vehicle type 250 can also be a model of an aircraft by a particular manufacturer.

Controller 214 determines adjustment 232 to the number of flight control settings 234 using prediction 230 of acceleration 270 and air vehicle type 250. Different types of air vehicles may be affected differently with the same value of acceleration 270. As a result, adjustment 232 for number of flight control settings 234 can be different for different types of vehicles for the same values of acceleration 270. In this illustrative example, adjustment 232 using air vehicle type 250 can be made using settings database 235. With this example, settings database 235 can include flight control settings 234 for use in air vehicle 201 of air vehicle type 250 based on acceleration 270 predicted for air vehicle 201 using prediction 230 generated using air vehicle model system 204. In other words, settings database 235 can be specific for air vehicle type 250 of air vehicle 201.

In the illustrative example, prediction 230 generated by air vehicle model system 204 can have confidence level 260 for prediction 230 of acceleration 270. In other words, the air vehicle model system 204 determines confidence level 260 of acceleration 270 predicted for air vehicle 201 that indicates the probability that prediction 230 is correct. With this example, controller 214 determines the adjustment 232 to the number of flight control settings 234 that reduces stress 240 on air vehicle 201 using prediction 230 of acceleration 270 and confidence level 260 for acceleration 270 predicted for air vehicle 201.

Settings database 235 can include flight control settings 234 based on both acceleration 270 that is predicted and confidence level 260 of prediction 230 of acceleration 270. For example, a prediction of a 0.5 G peak acceleration can be predicted for two different environments such as over the ocean and over a mountain range. The uneven terrain of mountains can result in a confidence level that may only be 10%. The confidence level of the prediction over the level ocean may be 75%.

In another example, a prediction of 1.2 G peak acceleration may be predicted for two different times of day such as in the afternoon and at midnight. But given that the airflows are more abundant at night due to solar heating, the confidence level may only be 20% during the afternoon while the confidence level at midnight may be 90%.

Controller 214 adjusts the number of flight control settings 234 using adjustment 232. In these examples, adjusting the number of flight control settings 234 using adjustment 232 can increase fuel efficiency 242 for air vehicle 201.

In another illustrative example, other parameters can be used in addition to acceleration 270 in determining prediction 230 of acceleration 270. For example, these parameters can be a number of environmental parameters 223. The number of environmental parameters 223 can take a number different forms. For example, the number of environmental parameters 223 can be selected from at least one of a temperature, a pressure, an air density, a humidity, or other environmental parameters that can affect engine performance 225.

With this example, air vehicle model system 204 has been trained to predict acceleration 270 for air vehicle 201 using current measurement 224 of acceleration 270, current measurement 224 of the number of environmental parameters 223, and backscatter data 222. In this illustrative example, current measurement 224 of the number of environmental parameters 223 can be made using sensor system 226 for air vehicle 201.

For example, an outside air temperature (OAT) sensor in sensor system 226 can measure temperature. A pitot tube in sensor system 226 can measure pressure. As another example, a humidity probe in sensor system 226 can measure humidity. In these examples, measurements of pressure and temperature can be used to determine air density. In other words, sensor system 226 can measure air density indirectly using measurements of temperature and pressure.

Sensor system 226 sends current measurement 224 of acceleration 270 and current measurement 224 of the number of environmental parameters 223 to controller 214. Controller 214 determines prediction 230 of acceleration 270 for air vehicle 201 using air vehicle model system 204, current measurement 224 of acceleration 270, current measurement 224 of the number of environmental parameters 223, and backscatter data 222. Current measurement 224 of acceleration 270, current measurement 224 of the number of environmental parameters 223, and backscatter data 222 are inputs into air vehicle model system 204.

Controller 214 determines adjustment 232 to a number of flight control settings 234 for air vehicle 201 that reduces stress 240 on air vehicle 201 using prediction 230 of acceleration 270. In this example, adjustment 232 to the number of flight control settings 234 can be made using settings database 235.

In still another illustrative example, air vehicle model system 204 can be trained to predict both acceleration 270 and the number of environmental parameters 223 using current measurement 224 of acceleration 270, current measurement 224 of the number of environmental parameters 223, and backscatter data 222. With this example, controller 214 determines prediction 230 of acceleration 270 and the number of environmental parameters 223 for the air vehicle 201 using air vehicle model system 204, current measurement 224 of acceleration 270, current measurement 224 of the number of environmental parameters 223, and backscatter data 222. Further with this example, current measurement 224 of acceleration 270, current measurement 224 of the number of environmental parameters 223, and backscatter data 222 are inputs into air vehicle model system 204.

Controller 214 determines adjustment 232 to a number of flight control settings 234 for air vehicle 201 that reduces stress 240 on air vehicle 201 using prediction 230 of acceleration and the number of environmental parameters 223.

In yet another illustrative example, the air vehicle model is trained to predict a number of atmospheric states 281 for air vehicle 201 using current measurement 224 of the number of atmospheric states 281. In this example, the number of atmospheric states 281 can be at least one of the number of environmental parameters 223 or wind 283 at distances 284 from air vehicle 201.

In this example, the number of environmental parameters 223 can be selected from at least one of a temperature, a pressure, an air density, a humidity or other environmental parameters 223. The number of wind conditions 287 is wind 283 at a number of distances 284 from air vehicle 201. In these examples, the number of distances 284 is a number of distances from air vehicle 201.

The number of distances 284 for wind 283 can be one or more values. For example, the number of distances 284 can be zero. When the number of distances 284 is zero, wind 283 is at air vehicle 201. In other words, wind 283 can be wind encountered by or contacting air vehicle 201. The measurement of wind 283 with a distance of zero can be measured indirectly by measuring acceleration 270 of air vehicle 201. In one illustrative example, acceleration 270 that is measured can be vertical acceleration 271 to indirectly measure wind 283 at air vehicle 201. In this example, wind 283 at air vehicle 201 can cause stress 240, which can be measured using acceleration 270.

The measurement of wind 283 at distances 284 greater than zero can be measured using lidar system 203. In this example, the distance can be such that backscatter light 221 is received at some period of time after emitting laser beam 220.

In one illustrative example, backscatter light 221 is treated as a variable associated with a user selected time. For example, a variable B20 can be selected to represent backscatter light 221 that is 20 seconds away from the aircraft. That is, the backscatter comes from a mass of air that is located 20 seconds in front of the air vehicle 201 based on the speed of the air vehicle 201.

If air vehicle 201 is traveling at 600 mph, then the distance that lidar system 203 needs to probe ahead of air vehicle 201 is distance=velocity×time. As are result, d=600 mph×20 sec=600 mph×(5 sec)/(60 sec×60 min)=600×5/3600=3.33 miles=5,359 meters. Lidar system 203 can probe a mass of air that is some specific distance ahead of air vehicle 201 using a number of different methods.

For example, one method uses a single lens to send and receive a pulse of light. This pulse of light will continuously send backscatter light 221 to air vehicle 201 as it propagates away from air vehicle 201.

In this example, lidar system 203 closes its eye and only opens it when the backscatter from a distance of 5,359 meters has reached the lens in lidar system 203. The closing and opening of the eye for lidar system 203 is called gating. The gating means that lidar system 203 processes a portion of backscatter light 221 within a specified range or time window. With this example, lidar system 203 lidar knows how far its looking ahead by timing its gating properly. For example, since light travels 1 meter in 3.33 nanoseconds, after sending a light pulse, lidar system 203 waits 3.33 nanoseconds×5,359×2=35,691 nanoseconds=36 microseconds. In this example, "×2" accounts for the round-trip time.

In another method, lidar system 203 sends out a pulse of light for laser beam 220 using two lenses. One lens transmits laser beam 220, and the other lens receives backscatter light 221. In this example, the eye of lidar system 203 is always open because lidar system 203 will only see backscatter light 221 when the pulse of light in laser beam 220 crosses an "integration volume" laser beam 220 and backscatter light 222 intersecting each other. Further In this example, lidar system 203 knows how far it is looking ahead by intersecting laser beam 220 and backscatter light 221 at the desired distance ahead of air vehicle 201. The integration volume is the region of the transmit beam that the receiving lens sees.

With this example, controller 214 determines prediction 230 of the number of atmospheric states 281 using air vehicle model system 204 and current measurement 224 of number of atmospheric states 281. Controller 214 determines an adjustment to a number of flight control settings 234 for air vehicle 201 using the prediction of the number of atmospheric states. Controller 214 adjusts the number of flight control settings 234 using adjustment 232. In this manner, controller 214 can control the operation of air vehicle 201 during flight through atmosphere 210.

Figure 3:
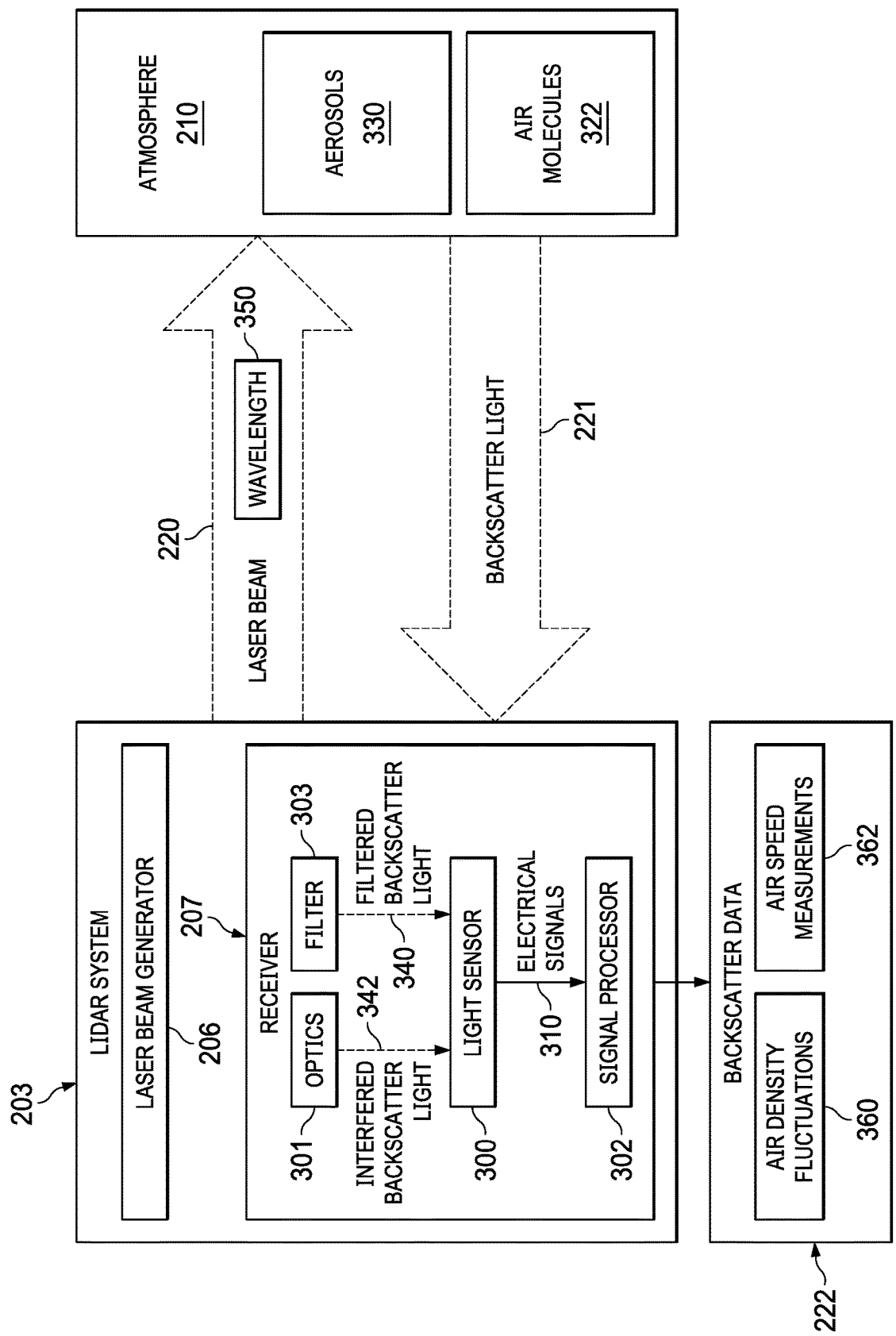
FIG. 3 is an illustration of dataflow in generating backscatter data in accordance with an illustrative environment.

Turning to FIG. 3, an illustration of dataflow in generating backscatter data in accordance with an illustrative environment. In the illustrative examples, the same reference numeral may be used in more than one figure. This reuse of a reference numeral in different figures represents the same element in the different figures.

In this example, backscatter light 221 is received by receiver 207 in response to laser beam generator 206 emitting laser beam 220 into atmosphere 210. Receiver 207 processes backscatter light 221 to generate backscatter data 222.

In this illustrative example, receiver 207 comprises light sensor 300, optics 301, filter 303, and signal processor 302. Light sensor 300 can be, for example, a photodetector system that detects backscatter light 221 and generates electrical signals 310. Optics 301 can operate to direct backscatter light 221 in the direction of light sensor 300. Further, optics 301 can also receive a portion of laser beam 220 and direct that portion of laser beam 220 to light sensor 300 when interference between laser beam 220 and backscatter light 221 is used in generating backscatter data 222.

Filter 303 can operate to filter backscatter light 221 to block undesired wavelengths of light in backscatter light 221 and pass desired wavelengths of light in backscatter light 221. Filter 303 can be implemented using at least one of a bandpass filter, a band-reject filter, a polarization filter, or other suitable types of filters.

In one illustrative example, light sensor 300 detects backscatter light 221 passing through optics 301 and optionally through filter 303 to generate electrical signals 310 that are processed by signal processor 302 to generate backscatter data 222. Signal processor 302 is a hardware component and can include software. Signal processor 302 can be implemented using at least one of a processor unit, circuit system, an integrated circuit, an application-specific integrated circuit (ASIC), a programmable logic device, or some other suitable type of hardware configured to perform a number of operations with electrical signals 310.

In one illustrative example, lidar system 203 uses receiver 207 to filter backscatter light 221 to remove backscatter light 221 caused by aerosols 330 in atmosphere 210 scattering laser beam 220 in atmosphere 210 to form filtered backscatter light 340. In this example, lidar system 203 filters out backscatter light 221 having wavelength 350 of laser beam 220. This filtering can be performed using filter 303 such that wavelengths of light on either side of wavelength 350 of laser beam 220 are passed through filter 303. Wavelength 350 or a range of wavelengths around wavelength 350 are not passed (i.e., blocked.

In this illustrative example, backscatter light 221 from aerosols 330 is the same or about the same wavelength spectrum as laser beam 220 transmitted by laser beam generator 206. Backscatter light 221 from air molecules 322 in atmosphere 210 is a spectrum that is spread similar to a rainbow. The total backscatter power in backscatter light 221 can be used to measure density fluctuations in air molecules 322 if the backscatter light from aerosols is removed from the spectrum by filtering or blocking. The spectral width (or full-width-half-maximum) can be used to measure the temperature of the air mass.

With this example, lidar system 203 determines air density fluctuations 360 using filtered backscatter light 340 to form backscatter data 222. Filtered backscatter light 340 is detected by light sensor 300 which generates electrical signals 310 that are sent to signal processor 302. In these illustrative examples, electrical signals 310 represent power measurements made by light sensor 300 detecting the filtered backscatter light 340. In other words, light sensor 300 measures a power of the backscatter light 221 in which these power measurements are used to generate electrical signals 310.

Signal processor 302 using electrical signals returns to generate air speed measurements 362. This backscatter data 222 is sent to controller 214.

In another illustrative example, in generating the backscatter data 222, lidar system 203 can interfere a portion of laser beam 220 with backscatter light 221 to form interfered backscatter light 342. This interference can be performed using optics 301 in receiver 207.

Lidar system 203 determines air speed measurements 362 from interfered backscatter light 342 to form the backscatter data 222. In this example, interfered backscatter light 342 is detected by light sensor 300, which generates electrical signals 310 that are sent to signal processor 302. Electrical signals 310 represent power measurements made of interfered backscatter light 342 detected by light sensor 300. Signal processor 302 receives and processes electrical signals 310 to generate air speed measurements 362.

Figure 4:
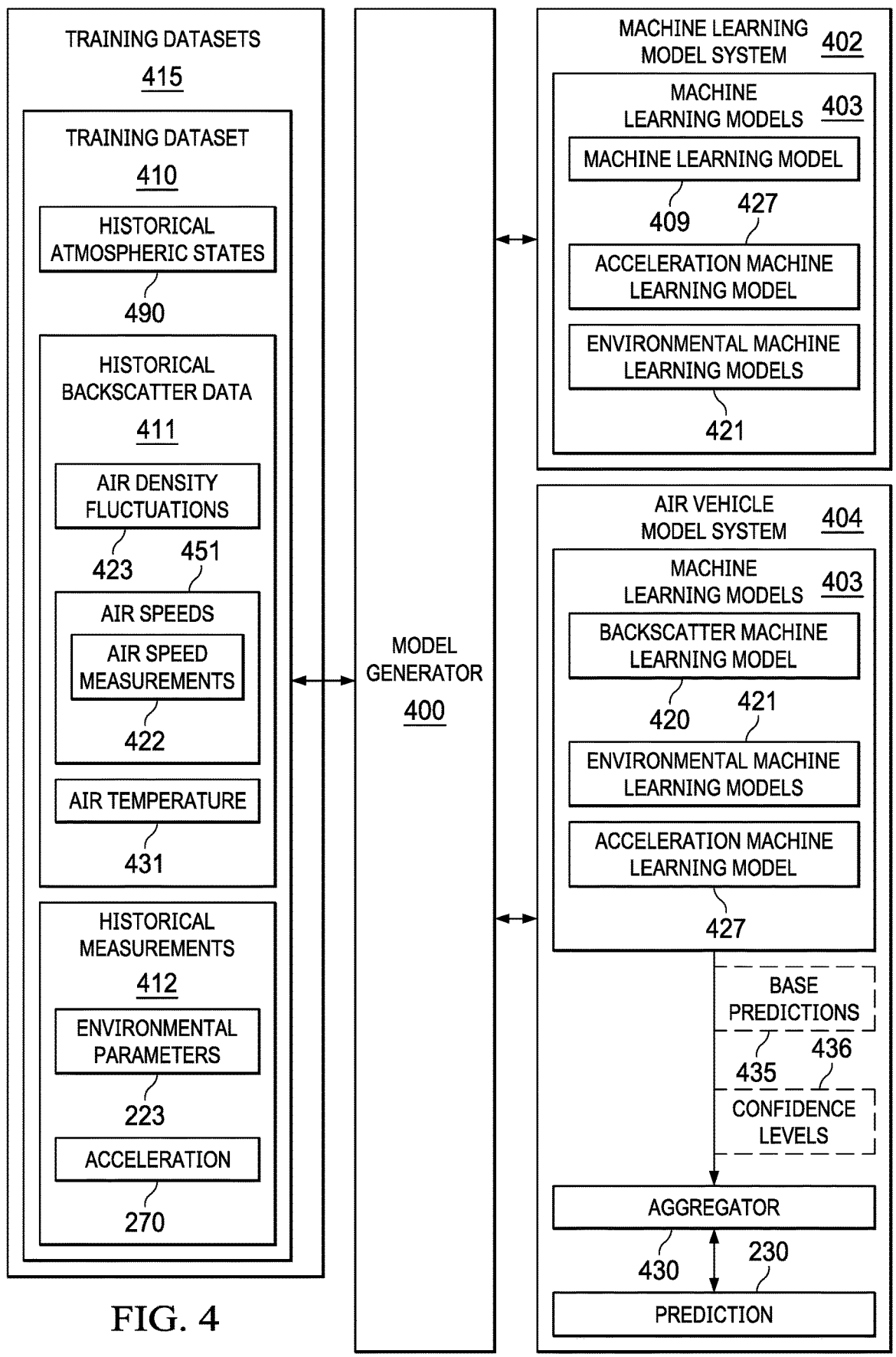
FIG. 4 is an illustration of training a machine learning model in accordance with an illustrative embodiment.

With reference next to FIG. 4, an illustration of training a machine learning model is depicted in accordance with an illustrative embodiment. In this illustrative example, an artificial intelligence system in the form of a machine learning model is trained to predict various parameters using backscatter data and current measurements of parameters from a sensor system.

As depicted, model generator 400 can be implemented using software, hardware, firmware, or a combination thereof. Model generator 400 can operate to train machine learning model system 402 to form air vehicle model system 404. In this example, air vehicle model system 404 is a trained version of machine learning model system 402.

Machine learning model system 402 comprises a number of machine learning models 403. This number of machine learning models can be selected from at least one of a neural network, a recurrent neural network (RNN), a long-term short-term memory (LSTM) network, gated recurrent units (GRUs), a temporal convolutional network (TCN), an echo state network (ESN), a sequence-to-sequence model, a transformer model, a hidden Markov model (HMM), a time delay neural network (TDNN), and other suitable types of machine learning models. In this example, machine learning models used in machine learning model system 402 can be models used in connected sequence at applications such as timeseries forecasting and signal processing.

As depicted, model generator 400 creates training dataset 410. This training dataset can be generated from a flight of a number of air vehicles. Air vehicles in the number of air vehicles can be of the same type of the vehicle in which air vehicle model system 204 is to be used or in a different type of air vehicle.

As depicted, data that can be used to form training dataset 410 comprises historical backscatter data 411 generated during a flight of a number of air vehicles, historical measurements 412 of the number of environmental parameters 223 made during the flight of the number of air vehicles, and historical measurements 412 of acceleration 270.

In one example, historical backscatter data 411 can comprise air density fluctuations 423 measured using backscatter light. Air density fluctuations 423 can be determined from power measurements of the backscatter light.

In another example, historical backscatter data 411 can comprise air speeds 451 measured using the backscatter data generated from interfering the laser beam with the backscatter light. These measured air speeds can be referred to as air speed measurements 422. Shifts in wavelength relative to the wavelength of the laser beam can be used to determine the air speed.

In yet another illustrative example, historical backscatter data 411 can comprise air temperature 431 in the environmental parameters 223 measured using the backscatter data 222 generated from interfering the laser beam 220 with backscatter light 221. In this example, the backscatter light 221 provides measurements of frequencies in the form of a frequency spectrum. The spectrum contains colors and temperature can be determined based on the shape of the frequency spectrum (i.e., color spectrum).

Different combinations of this data can be selected by model generator 400 to form training dataset 410 for use by model generator 400 to train machine learning model system 402 to form air vehicle model system 404. In the illustrative examples, training dataset 410 can be comprised of at least one of historical backscatter data 411, historical measurements of acceleration 270, or historical measurements 412 of a number of environmental parameters 223. These different combinations of data can be used to form different versions of training dataset 410 to generate different versions of air vehicle model system 404.

In one example, model generator 400 creates training dataset 410 comprising historical backscatter data 411 generated during a flight of a number of air vehicles and historical measurements 412 of acceleration 270 made during the flight of the number of air vehicles. With this example, model generator 400 trains machine learning model 409 in machine learning model system 402 using this version of training dataset 410 to form air vehicle model system 404 that predicts acceleration 270 for air vehicle 201 using backscatter data 222.

In this depicted example, model generator 400 can perform supervised training of machine learning model system 402 to train machine learning model system 402 to predict acceleration using backscatter as input. For example, machine learning model system 402 can be trained using training dataset 410 with an optimization algorithm that minimizes error in predicting acceleration from backscatter. With this example, this training can be performed using historical backscatter data 411 and minimizing error in predicting backscatter using this historical backscatter data. Further, other steps can be performed such as using validations tuning Hyperparameter to prevent overfitting.

In another illustrative example, model generator 400 creates training dataset 410 comprising historical backscatter data 411 generated during a flight of a number of air vehicles, historical measurements 412 of acceleration 270 and historical measurements 412 of the number of environmental parameters 223 made during the flight of the number of air vehicles. The number of environmental parameters 223 can be selected based on at least one of parameters that can affect engine performance or are predictive of acceleration from air turbulence. In other words, an environmental parameter can be selected based on whether that parameter has an effect on engine performance, is predictive of acceleration a future point in time, or both.

Model generator 400 trains machine learning model 409 in machine learning model system 402 using this training dataset to form air vehicle model system 404 that predicts acceleration 270 using current measurement 224 of acceleration 270, current measurement 224 of the number of environmental parameters 223, and backscatter data 222.

In yet another illustrative example, model generator 400 creates training dataset 410 to include historical backscatter data 411 generated during a flight of a number of air vehicles, historical measurements 412 of acceleration 270, and historical measurements 412 of the number of environmental parameters 223 made during the flight of the number of air vehicles. With this version of training dataset 410, model generator 400 trains machine learning model 409 in machine learning model system 402 to form the air vehicle model system 404 that predicts acceleration 270 and the number of environmental parameters 223 using current measurement 224 of acceleration 270, current measurement 224 of the number of environmental parameters 223, and backscatter data 222.

In still another illustrative example, model generator 400 creates training datasets 415 that comprise historical backscatter data 411 generated during flights of a number of air vehicles, historical measurements 412 of the acceleration 270, and historical measurements 412 of the number of environmental parameters 223 made during the flight of the number of air vehicles. In this example, the number of environmental parameters 223 can be selected based on those parameters considered indicative of future accelerations of air vehicle 201 that can be caused by air turbulence.

With this example, training datasets 415 are used to train machine learning model system 402 to predict acceleration 270 for air vehicle 201 using a current measurement 224 of acceleration 270, a number of environmental parameters 223, and backscatter data 222. With this example, train machine learning model system 402 comprises backscatter machine learning model 420 and a number of environmental machine learning models 421.

In this example, model generator 400 generates one training dataset in training datasets 415 that comprises historical backscatter data 411 and historical measurements 412 of acceleration 270. A number of other datasets in training datasets for 411 comprise different combinations of historical measurements 412 of the number of environmental parameters 223 and historical measurements 412 of acceleration 270.

For example, one of training datasets 415 may comprise historical measurements 412 of temperature and historical measurements 412 of acceleration 270. Another training dataset in training datasets 415 may comprise historical measurements 412 of pressure and historical measurements of acceleration 270.

Model generator 400 trains machine learning model system 402 comprising backscatter machine learning model 420 and a number of environmental machine learning models 421 using training datasets 415 in which backscatter machine learning model 420 and the number of environmental machine learning models 421 output base predictions 435 for acceleration 270 using current measurement 224 of the number of environmental parameters 223 and backscatter data 222. Each of these training datasets is used to train one of machine learning models 403.

For example, backscatter machine learning model 420 is trained using the training dataset comprising historical backscatter data 411 and historical measurements 412 of acceleration 270. The number of environmental machine learning models 421 is trained with one of training datasets 415 comprising historical measurements of acceleration 270 and one of the number of environmental parameters 223.

One of environmental machine learning models 421 can be trained using a training dataset comprising historical measurements 412 of temperature and historical measurements 412 of acceleration 270. Another of environmental machine learning models 421 can be trained using a training dataset comprising historical measurements 412 of pressure and historical measurements of acceleration 270.

This training results in air vehicle model system 404 that comprises trained versions of machine learning models 403 that include backscatter machine learning model 420 and a number of environmental machine learning models 421. In this example, backscatter machine learning model 420 predicts acceleration 270 using a current measurement 224 of acceleration 270 and backscatter data 222. Each of the number of environmental machine learning models 421 used to predict acceleration 270 using current measurement 224 of acceleration 270 and current measurement 224 of an environmental parameter in the number of environmental parameters 223 for an environmental machine learning model is trained. In this example, as trained, backscatter machine learning model 420 and the number of environmental machine learning models 421 output base predictions 435 of acceleration 270 and confidence levels 436 for base predictions 435.

In these examples, the input into backscatter machine learning model 420 comprises current measurement 224 of acceleration 270 and backscatter data 222 with the output being a base prediction of acceleration 270. The input into an environmental machine learning model is current measurement 224 of acceleration 270 and current measurement 224 of an environmental parameter for which the environmental machine learning models 421 is trained. For example, environmental machine learning models 421 can be trained to predict temperature received using current measurement 224 of acceleration 270 and current measurement 224 of the temperature to output a base prediction of temperature and a confidence level.

Further, this version of air vehicle model system 404 also includes aggregator 430. In this example, aggregator 430 determines prediction 230 of acceleration 270 using base predictions 435 of acceleration 270 and confidence levels 436 for base predictions 435 output from the backscatter machine learning model 420 and the number of environmental machine learning models 421. In this example, a confidence level for prediction can be the probability that the prediction is valid or correct.

In this depicted example, aggregator 430 can use various processes or algorithms to determine prediction 230 from base predictions 435 and confidence levels 436. For example, aggregator 430 can use at least one of weighted averaging, Bayesian averaging, an ensemble method, a threshold-based selection, Bayesian vision model averaging, neural network fusion, or other types of mechanisms.

In another illustrative example, another training dataset in training datasets 415 can be created that comprises historical measurements 412 of acceleration 270. In this example, historical measurements 412 can include two copies of data for historical measurements 412 of acceleration to submit. One copy of this data can be shifted in time for creating training dataset 410. Air vehicle model system 404 trains acceleration machine learning model 427 to predict acceleration 270 using current measurement 224 of acceleration 270.

In other illustrative examples, other combinations of machine learning models can be used in air vehicle model system 404. For example, acceleration machine learning model 427 can be used in place of the backscatter machine learning model 420.

In yet another example, different combinations of environmental machine learning models 421 can be used in different implementations to predict acceleration 270. For example, a number of environmental machine learning models 421 can include environmental machine learning models

421 for at least one of a temperature, a pressure, an air density, a humidity, or other environmental parameters.

Thus, different versions of air vehicle model system 204 can perform different types of predictions based on the composition of training dataset 410. In one illustrative example, air vehicle model system 204 predicts a number of environmental parameters 223 using backscatter data and a current measurement of the number of environmental parameters 223 as an input. In another example, air vehicle model system 204 predicts acceleration 270 and the number of environmental parameters 223 using a current measurement of acceleration 270 and a current measurement of the number of environmental parameters 223 and backscatter data as an input. In yet another example, air vehicle model system 204 predicts acceleration 270 using a current measurement of acceleration 270 and backscatter data as input.

In these illustrative examples, when training dataset 410 comprises at least one of historical backscatter data 411, historical measurements of acceleration 270, or a number of environmental parameters 223, this historical data can be historical atmospheric states 490.

In this illustrative example, machine learning algorithms used to train machine learning model system 402 can take different forms. Supervised and unsupervised training can be used in these examples. Further, although not shown, training datasets 415 can also use other information to train machine learning model system 402. For example, labels can be added to identify air vehicles. As another example, timestamps can also be present to allow correlation of this data with each other. Further, the data is organized as time series data for training in these examples. In this example, these the data points can be in regular intervals that allow machine learning models to make projections or uncover patterns over time.

With this type of data, machine learning algorithms that are employed for time series analysis can be used to train machine learning model system 402. Examples of machine learning algorithms include, for example, AutoRegressive Integrated Moving Average (ARIMA, Long Short-Term Memory (LSTM), and Prophet. In this example, LSTM is a type of recurrent neural network (RNN) that is configured for time series data that may include missing data points and periodic patterns.

Figure 5A:
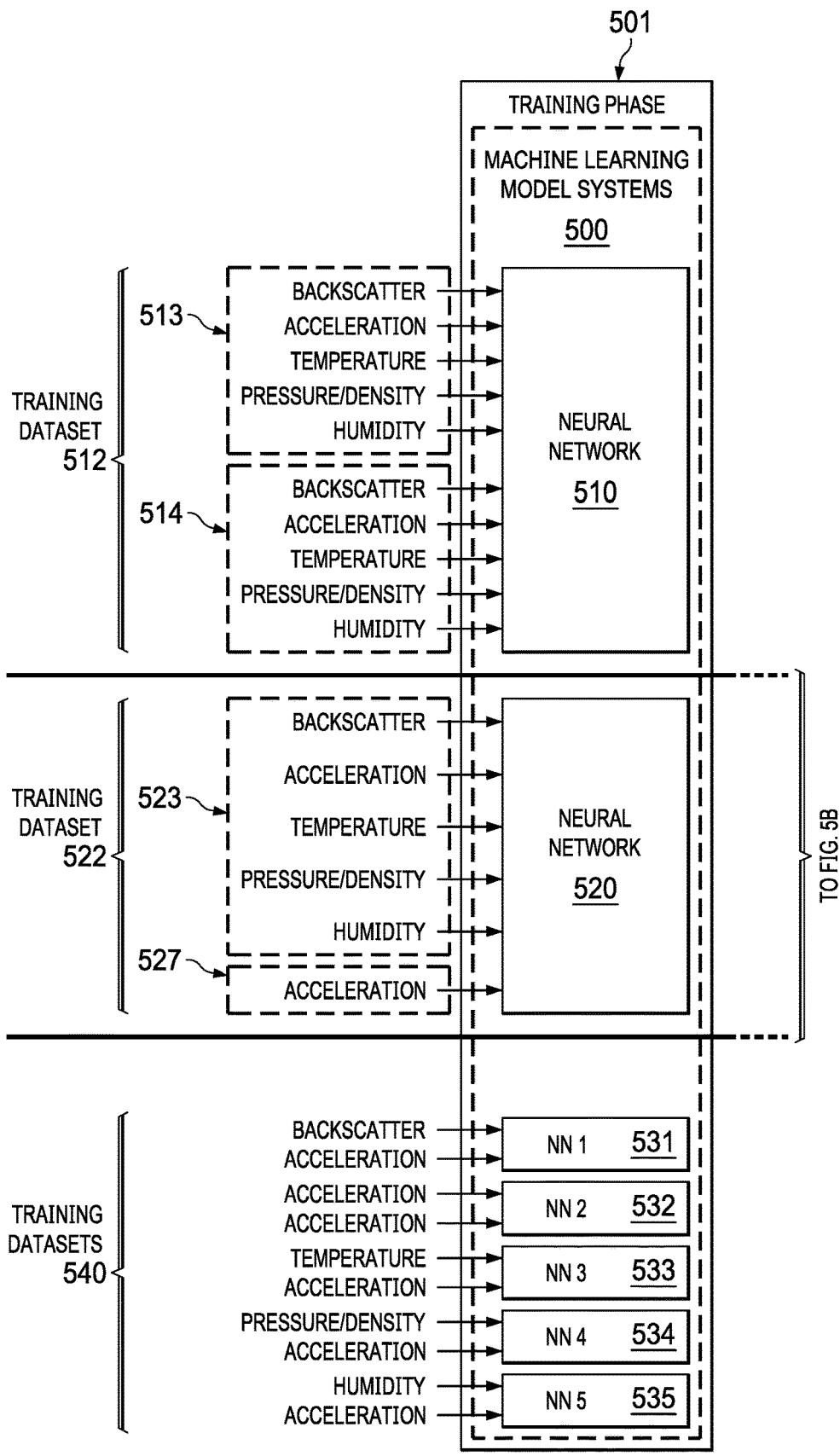
FIGS. 5A and 5B are an illustration of machine learning model systems trained to predict acceleration to form air vehicle model systems in accordance with an illustrative embodiment.
Figure 5B:
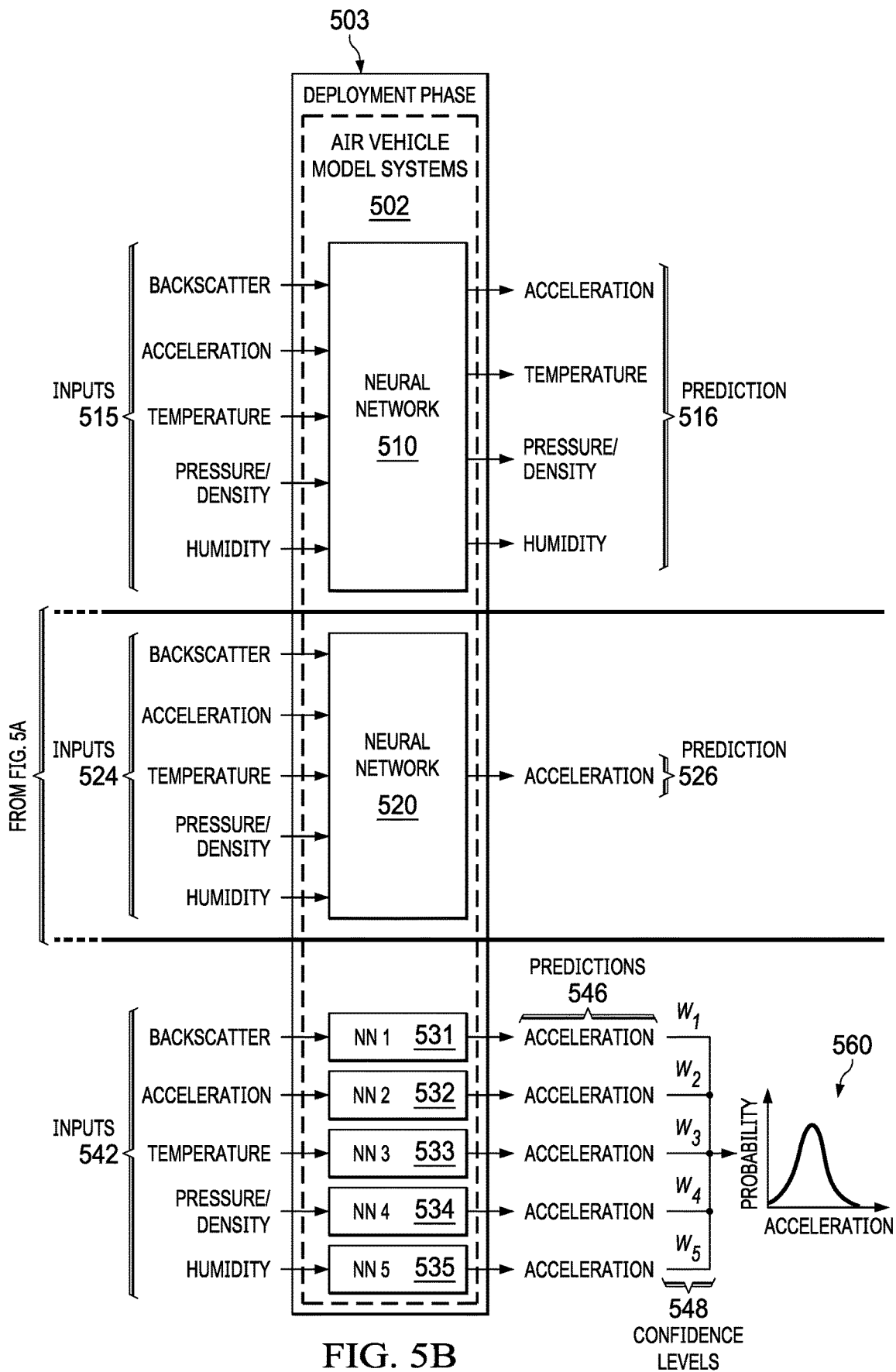

With reference now to FIGS. 5A and 5B, an illustration of machine learning model systems trained to predict acceleration to form air vehicle model systems is depicted in accordance with an illustrative embodiment. In this illustrative example, machine learning model systems 500 are an example of implementations for machine learning model system 402 in FIG. 4. Air vehicle model systems 502 are an example of implementations for air vehicle model system 404 in FIG. 4.

As depicted, in training phase 501, neural network 510 is a machine learning model system in machine learning model systems 500 that is trained to predict acceleration and environmental parameters in the form of temperature, pressure/density, and humidity.

In this example, the data in training dataset 512 comprises historical data 513 in the form of backscatter, acceleration, temperature, pressure/density, and humidity and shifted historical data 514 in the form of backscatter, acceleration, temperature, pressure/density, and humidity. In this example, shifted historical data 514 is shifted to be earlier. An event in this data occurs prior to data for the same event in the in historical data 513. The shifting can be performed by adjusting timestamps in shifted historical data 514.

In this example, this historical data is collected during the flight of a number of vehicles. In this illustrative example, this data can include timestamps so that the data can be correlated with each other in training neural network 510. In this illustrative example, this data can include timestamps so that the data can be correlated with each other in training neural network 510.

Shifted historical data 514 is historical data 513 that is shifted in time. The time can be, for example, 10 seconds, 20 seconds, 27 seconds, or some other period of time. For example, all variables are treated the same. In other words, whatever is measured now, the neural network needs to find a correlation between these "now" measurements and other measurements at some later specified time. In the case of a backscatter variable, it is treated the same as the other variable. But if the lidar system is set to look 10 seconds ahead, but the datasets being correlated are 30 seconds apart, the lidar data will probably not be as useful when looking for a correlation. If the lidar system is set to look 30 seconds ahead, then it is easier for the neural network to find a correlation.

In this example, after training in deployment phase 503, neural network 510 is an air vehicle model in air vehicle model systems 502. With this example, inputs 515 are sent into neural network 510. These inputs are backscatter, acceleration, temperature, prediction/density, and humidity. In response to receiving inputs 515, neural network 510 generates prediction 516. In this example, prediction 516 is a prediction of acceleration, temperature, pressure/density, and humidity.

As another example, neural network 520 is another example of a machine learning model system in machine learning model systems 500. In this example, neural network 520 is trained to predict acceleration.

In this example, the data in training dataset 522 comprises historical data 523 comprising backscatter, acceleration, temperature, pressure/density, and humidity. This data is historical data collected during the flight of a number of vehicles. Training dataset 522 also includes shifted historical data 527 comprising acceleration.

After training in deployment phase 503, neural network 520 is an air vehicle model in air vehicle model systems 502. Inputs 524 are sent into neural network 520. These inputs are backscatter, acceleration, temperature, prediction/density, and humidity. In response to receiving inputs 524, neural network 520 generates prediction 526. In this example, prediction 516 is a prediction of the acceleration.

In yet another example, NN 1 531, NN 2 532, NN 3 533, NN 4 534, and NN 5 535 are neural networks for a machine learning model system in machine learning model systems 500. In this example, these neural networks are all trained to predict acceleration.

As depicted in this example, training datasets 540 all include historical data for acceleration generated from the flight of a number of air vehicles. Each of the training datasets also includes historical data for a parameter of interest to be used for predicting acceleration. In this example, these parameters are backscatter, acceleration, temperature, pressure/density, and humidity. For example, the training dataset for NN 1 531 is historical data comprising backscatter and shifted historical data comprising acceleration. In this example, shifted historical data can be shifted based on the time the air vehicle to reach the location at which the backscatter light generated. For example, if the air vehicle data takes 20 seconds reach the location of where the back scatter light was generated, then the time shifted data is shifted by 20 seconds.

As another example, the training dataset for NN 2 532 is historical data comprising acceleration with shifted historical data comprising acceleration. In other words, two sets of acceleration data are present. Acceleration and a time-shifted version of the acceleration. For acceleration, the backscatter data is not needed for the training dataset. The current acceleration is measured and shifted historical data can be acceleration at a later time such as 20 seconds later.

The neural network processes this data for hundreds of thousands of hours of flight time to see if there is a pattern to predict acceleration. Similarly, for acceleration and temperature, or acceleration and density, or acceleration and humidity, backscatter data is not needed. The aggregator then takes all of this in to make a prediction about future acceleration.

Further, the training dataset for NN 3 533 is historical data comprising temperature and shifted historical data comprising acceleration; the training dataset for NN 4 534 is historical data comprising pressure/density and shifted historical data comprising acceleration; and the training dataset for NN 5 535 is historical data comprising humidity and shifted historical data comprising acceleration.

In this example, this training data in training datasets 540 are time series data and can also include timestamps. This example, the shifted historical data is historical data for a parameter that is shifted in time. In other words, the timestamps can be changed to reflect a time shift.

After training in deployment phase 503, NN 1 531, NN 2 532, NN3 533, NN4 534, and NN 5 535 are air vehicle models in an air vehicle model system in air vehicle model systems 502.

With this example, inputs 542 are current measurements of parameters from a sensor system in an air vehicle that are input into these neural networks to obtain predictions 546 of acceleration. The predictions made by these neural networks are predictions of future acceleration. As depicted, a current measurement input into NN 1 531 is backscatter; the current measurement input into NN 2 532 is acceleration; the current measurement input into NN 3 533 is temperature; the current measurement input into NN 4 534 is pressure/density; and the current measurement input into NN 5 535 is humidity. In response to these inputs, predictions 546 of acceleration are output by these neural networks.

Additionally, these neural networks also output confidence levels 548. Predictions 546 with confidence levels 548 are used to determine the acceleration for the vehicle. In this example, these confidence levels are probabilities that the acceleration predicted by neural network is correct. The probabilities can be different for different neural networks as indicated by graph 560, which identifies probabilities for predictions of acceleration. The determination of the acceleration can be performed using various mechanisms including voting, averaging, or other suitable mechanisms.

In another illustrative example, the predictions of acceleration can be made by also using the current measurement of the acceleration in addition to the inputs 542. With this example, the current measurements input into NN 1 531 are backscatter and acceleration; the current measurements input into NN 2 532 are acceleration and acceleration; the current measurements input into NN 3 533 are temperature and acceleration; the current measurements input into NN 4 534 are pressure/density and acceleration; and the current measurements input into NN 5 535 are humidity and acceleration.

The illustrative example, air vehicle model system 204 can be distributed to air vehicles for use in and managing flight control settings in their vehicles.

The management of flight control settings can be performed using air vehicle model system 204 that results in at least one of reduced airframe fatigue or increased fuel efficiency. Reduced airframe fatigue can result from reducing the effects of turbulence that can be predicted through a prediction of acceleration 270. Increased fuel efficiency can result from flight control settings that increases engine performance in a manner that reduces fuel usage. This reduction in fuel usage can decrease the emission of greenhouse gases by the air vehicle.

In one illustrative example, one or more technical solutions are present that overcome a technical problem with at least one managing stresses from turbulence or managing engine performance to increase fuel efficiency. Further, one or more solutions can also increase passenger comfort during flight of an air vehicle.

As a result, one or more technical solutions may provide an ability to manage flight control settings in an air vehicle in a manner that provides a reduction in acceleration actually encountered as compared to the predicted acceleration which reduces stress on aircraft. One or more technical solutions can also increase engine performance in a manner that increases fuel efficiency that reduces the emission of greenhouse gases. Additionally, one or more technical solutions can also increase passenger comfort. Further, one or more technical solutions can enable designing an air vehicle that has a lighter weight with the same lifecycle as compared to a current air vehicle that does not use one or more illustrative examples to manage flight control settings.

Computer system 212 can be configured to perform at least one of the steps, operations, or actions described in the different illustrative examples using software, hardware, firmware, or a combination thereof. As a result, computer system 212 operates as a special purpose computer system in which controller 214 in computer system 212 enables managing operation of an air vehicle to reduce acceleration of an air vehicle by turbulence or other conditions. This reduction results in at least one of reducing stress on the air vehicle, increasing fuel efficiency of the air vehicle, or increasing passenger comfort during flight. Increased fuel efficiency can reduce greenhouse gases output by air vehicles managed using air vehicle management system 202.

One or more illustrative examples provide practical application of managing the operation of an aircraft. In one example, a controller is configured to determine a prediction of an acceleration using an air vehicle model system, a current measurement of the acceleration, and backscatter data. The air vehicle model system is trained to predict the acceleration using the current measurement of the acceleration and the backscatter data generated using backscatter light detected from emitting a laser beam in an atmosphere in a direction ahead of the air vehicle. The controller is configured to determine an adjustment to a number of flight control settings for the air vehicle that reduces a stress on the air vehicle using the prediction of the acceleration. The controller is configured to adjust the number of flight control settings using the adjustment. Thus, the illustrative example provides a practical application of operations performed by the controller to manage flight of an air vehicle.

Further, by reducing stress, the lifecycle of an air vehicle can be increased. This enables new air vehicles that use air vehicle management system 202 with lighter airframes that have the same lifecycle as an air vehicle without air vehicle management system 202. As a result, these new air vehicles have greater fuel efficiency and produce less greenhouse gases due to the lighter weight.

In particular, controller 214 transforms computer system 212 into a special purpose computer system as compared to currently available general computer systems that do not have controller 214.

The illustration of air vehicle environment 200 in the different components in FIGS. 2-5 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 214 can predict a number of environmental parameters 223 without predicting acceleration using air vehicle model system 204. In one illustrative example, the number of environmental parameters 223 can be predicted and used by controller 214 to determine flight control settings 234 that improve engine performance 225.

In this example, air vehicle model system 204 has been trained to predict a number of environmental parameters 223 in atmosphere 210 that affect engine performance 225 for the air vehicle 201 using current measurement 224 of the number of environmental parameters 223 and backscatter data 222.

With this example, the improvement in engine performance 225 is an improvement in fuel efficiency, which results in reducing greenhouse gases emitted by air vehicle 201.

Figure 6:
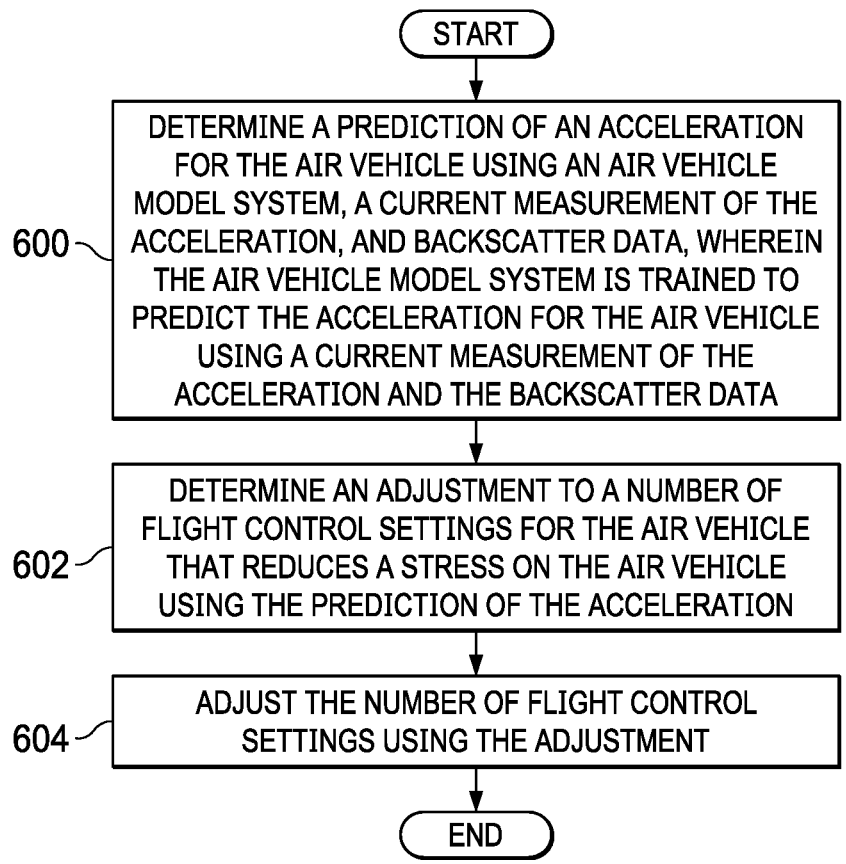
FIG. 6 is an illustration of a flowchart of a process for managing flight controls for an air vehicle in accordance with an illustrative embodiment.

Turning next to FIG. 6, an illustration of a flowchart of a process for managing flight controls for an air vehicle is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in controller 214 in computer system 212 in FIG. 2.

The process determines a prediction of an acceleration for the air vehicle using an air vehicle model system, a current measurement of the acceleration, and backscatter data, wherein the air vehicle model system is trained to predict the acceleration for the air vehicle using a current measurement of the acceleration and the backscatter data (operation 600). The process determines an adjustment to a number of flight control settings for the air vehicle that reduces a stress on the air vehicle using the prediction of the acceleration (operation 602).

The process adjusts the number of flight control settings using the adjustment (operation 604). The process terminates thereafter.

Figure 7:
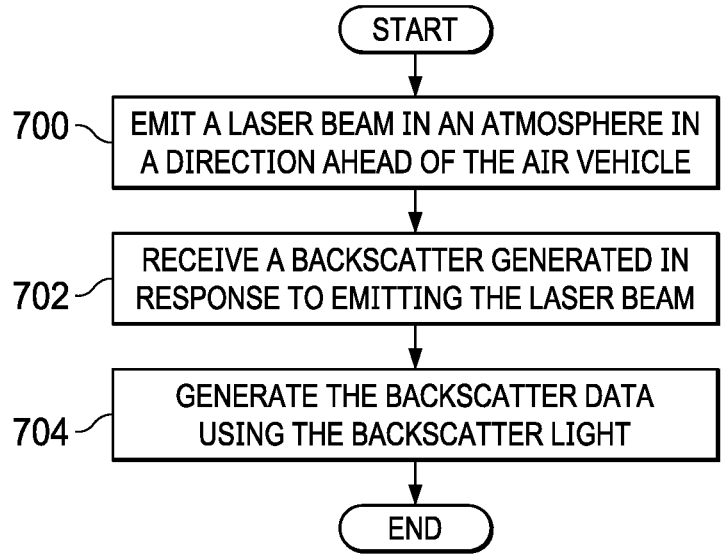
FIG. 7 is an illustration of a flowchart of a process for generating backscatter data in accordance with an illustrative embodiment.

Turning now to FIG. 7, an illustration of a flowchart of a process for generating backscatter data is depicted in accordance with an illustrative embodiment. The process in this figure is an example of additional operations that can be performed in the process in FIG. 6.

The process emits a laser beam in an atmosphere in a direction ahead of the air vehicle (operation 700). The process receives a backscatter generated in response to emitting the laser beam (operation 702).

The process generates the backscatter data using the backscatter light (operation 704). The process terminates thereafter.

Figure 8:
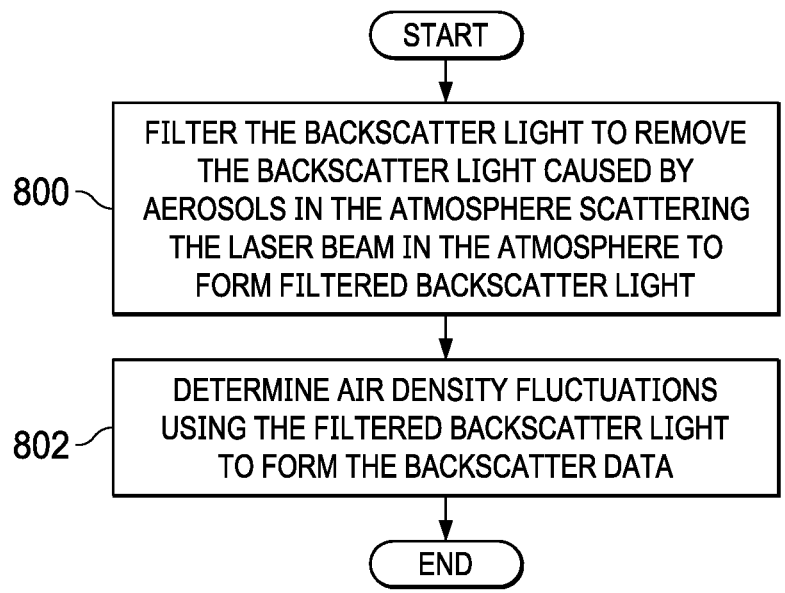
FIG. 8 is an illustration of a flowchart of a process for generating backscatter data in accordance with an illustrative embodiment.

Next in FIG. 8, an illustration of a flowchart of a process for generating backscatter data is depicted in accordance with an illustrative embodiment. The process illustrated in this figure is an example of an implementation for operation 704 in FIG. 7.

The process filters the backscatter light to remove the backscatter light caused by aerosols in the atmosphere scattering the laser beam in the atmosphere to form filtered backscatter light (operation 800). The process determines air density fluctuations using the filtered backscatter light to form the backscatter data (operation 802). The process terminates thereafter.

Figure 9:
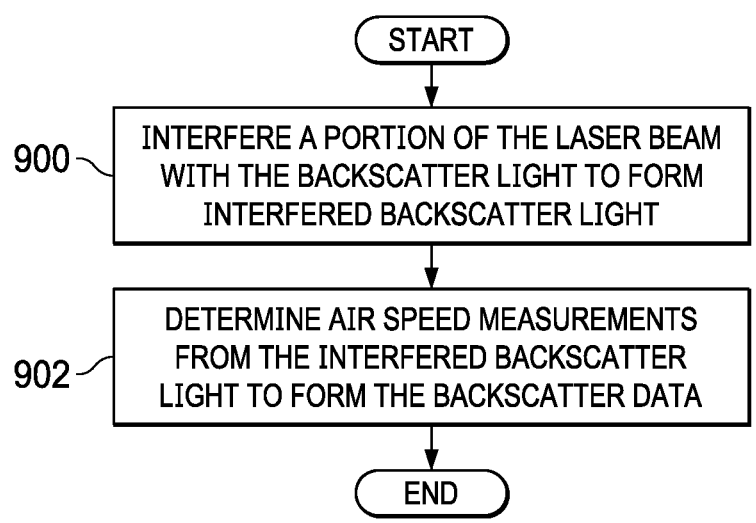
FIG. 9 is an illustration of a flowchart of a process for generating backscatter data in accordance with an illustrative embodiment.

With reference now to FIG. 9, an illustration of a flowchart of a process for generating backscatter data is depicted in accordance with an illustrative embodiment. The process illustrated in this figure is an example of an implementation for operation 704 in FIG. 7.

The process interferes a portion of the laser beam with the backscatter light to form interfered backscatter light (operation 900). The process determines air speed measurements from the interfered backscatter light to form the backscatter data (operation 902). The process terminates thereafter.

Figure 10:
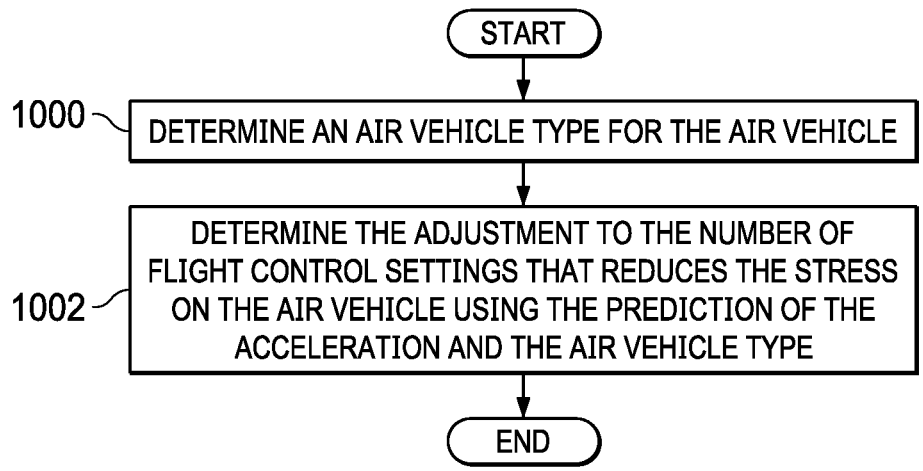
FIG. 10 is an illustration of a flowchart of a process for determining an adjustment in accordance with an illustrative embodiment.

With reference to FIG. 10, an illustration of a flowchart of a process for determining an adjustment is depicted in accordance with an illustrative embodiment. The process in this figure is an example of an implementation for operation 602 in FIG. 6.

The process determines an air vehicle type for the air vehicle (operation 1000). The process determines the adjustment to the number of flight control settings that reduces the stress on the air vehicle using the prediction of the acceleration and the air vehicle type (operation 1002). The process terminates thereafter.

Figure 11:
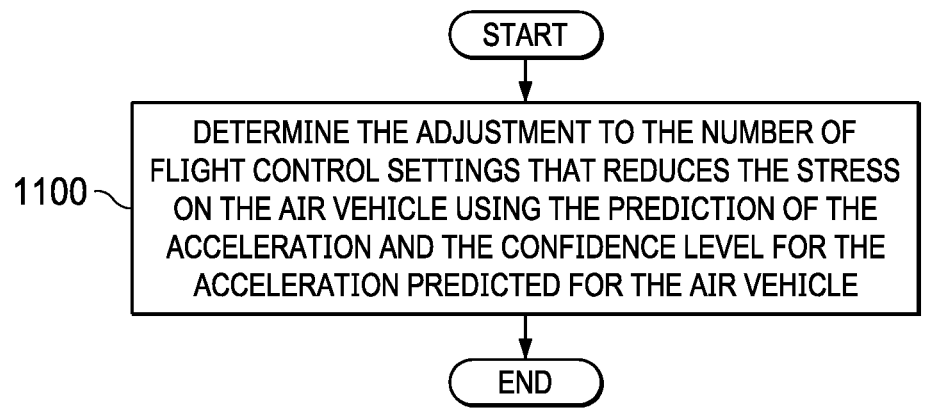
FIG. 11 is an illustration of a flowchart of a process for determining an adjustment in accordance with an illustrative embodiment.

In FIG. 11, an illustration of a flowchart of a process for determining an adjustment is depicted in accordance with an illustrative embodiment. The process in this figure is an example of an implementation for operation 602 in FIG. 6. In this example, air vehicle model system determines a confidence level of the acceleration predicted for the air vehicle.

The process determines the adjustment to the number of flight control settings that reduces the stress on the air vehicle using the prediction of the acceleration and the confidence level for the acceleration predicted for the air vehicle (operation 1100). The process terminates thereafter.

Figure 12:
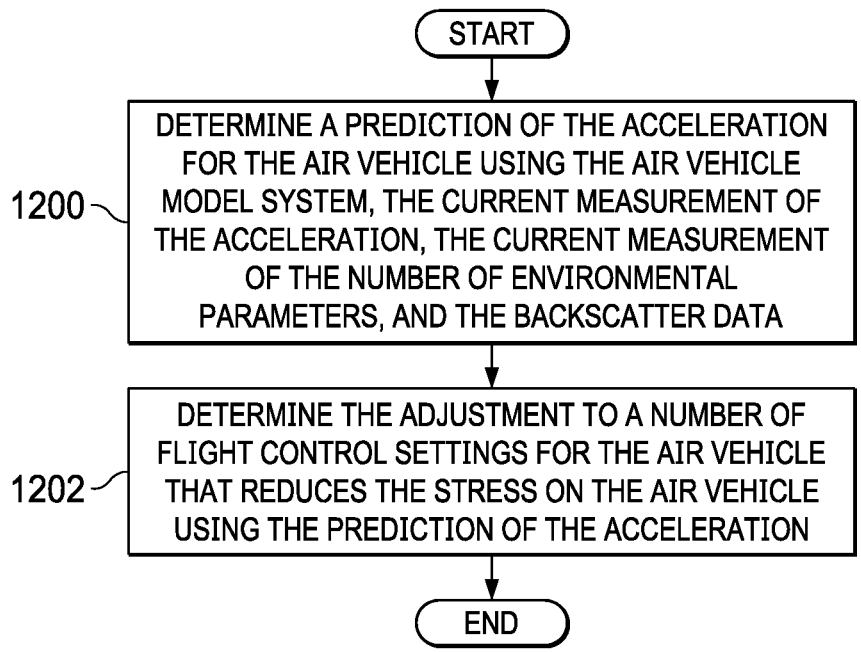
FIG. 12 is an illustration of a flowchart of a process for determining a prediction of acceleration in accordance with an illustrative embodiment.

Next with reference to FIG. 12, an illustration of a flowchart of a process for determining a prediction of acceleration is depicted in accordance with an illustrative embodiment. The process in this flowchart is an example of an implementation for operation 600 and operation 602 in FIG. 6. In this example, the air vehicle model system is trained to predict the acceleration for the air vehicle using the current measurement of the acceleration, the current measurement of the number of environmental parameters, and the backscatter data.

The process determines a prediction of the acceleration for the air vehicle using the air vehicle model system, the current measurement of the acceleration, the current measurement of the number of environmental parameters, and the backscatter data (operation 1200). The process determines the adjustment to a number of flight control settings for the air vehicle that reduces the stress on the air vehicle using the prediction of acceleration (operation 1202). The process terminates thereafter.

Figure 13:
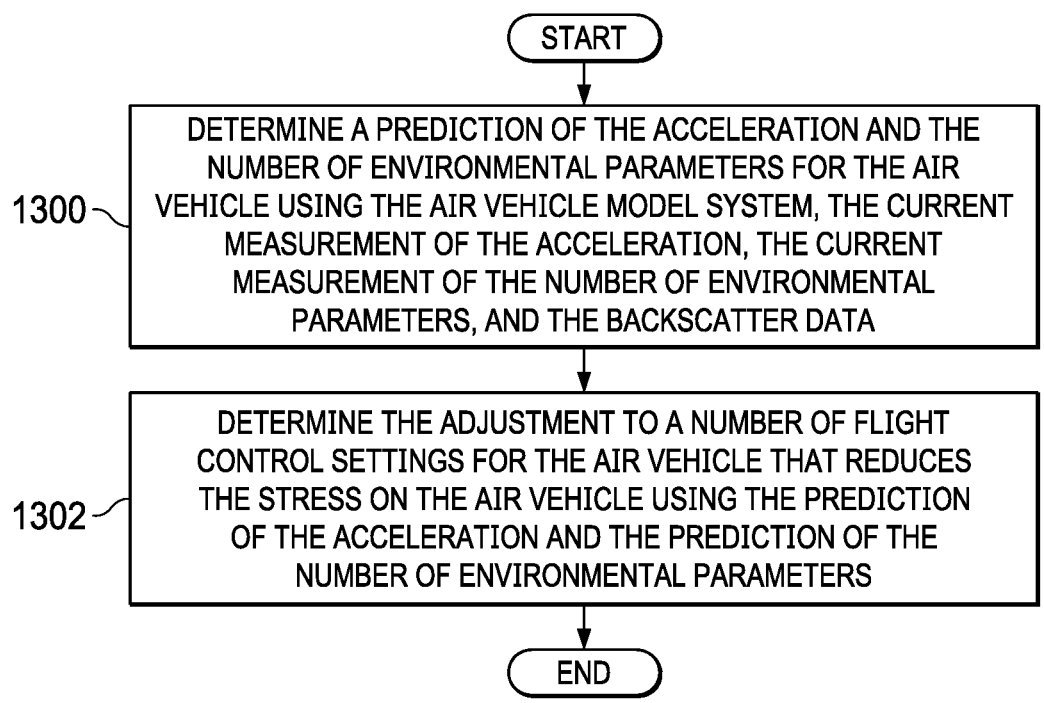
FIG. 13 is an illustration of a flowchart of a process for determining a prediction of acceleration in accordance with an illustrative embodiment.

With reference to FIG. 13, an illustration of a flowchart of a process for determining a prediction of acceleration is depicted in accordance with an illustrative embodiment. The process in this flowchart is an example of an implementation for operation 600 and operation 602 in FIG. 6. In this example, the air vehicle model system is trained to predict the acceleration for the air vehicle and the number of environmental parameters that affect engine performance for the air vehicle using the current measurement of the acceleration, the current measurement of the number of environmental parameters, and the backscatter data.

The process determines a prediction of the acceleration and the number of environmental parameters for the air vehicle using the air vehicle model system, the current measurement of the acceleration, the current measurement of the number of environmental parameters, and the backscatter data (operation 1300). The process determines the adjustment to a number of flight control settings for the air vehicle that reduces the stress on the air vehicle using the prediction of the acceleration and the prediction of the number of environmental parameters (operation 1302). The process terminates thereafter.

Figure 14:
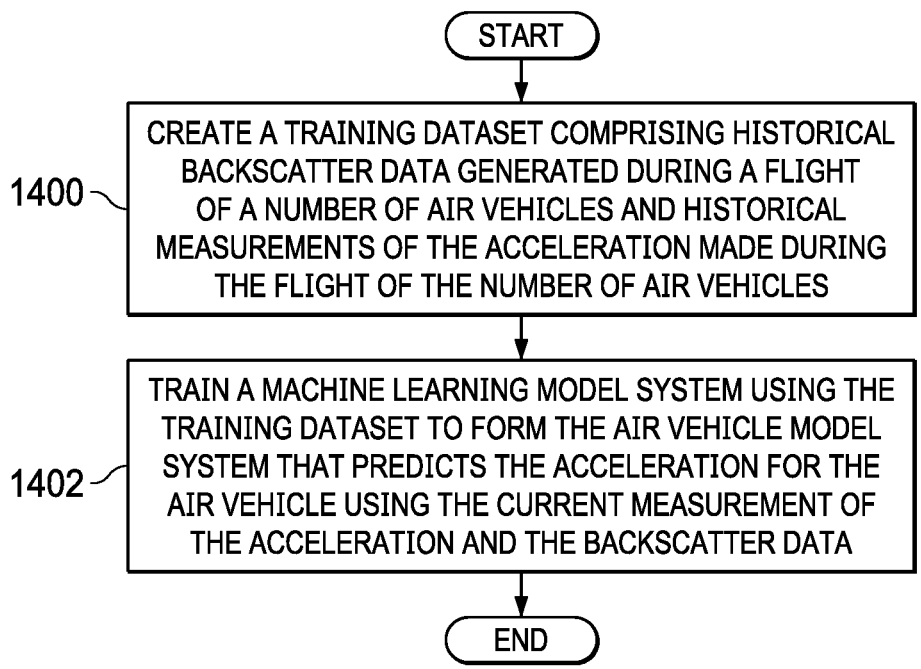
FIG. 14 is an illustration of a flowchart of a process for creating a training dataset in accordance with an illustrative embodiment.

With reference to FIG. 14, an illustration of a flowchart of process for creating a training dataset is depicted in accordance with an illustrative embodiment. The process in FIG. 14 can be implemented in hardware, software, or both. When implemented in software, the process can take the form of program instructions that are run by one or more processor units located in one or more hardware devices in one or more computer systems. For example, the process can be implemented in model generator 400 in FIG. 4.

The process creates a training dataset comprising historical backscatter data generated during a flight of a number of air vehicles and historical measurements of the acceleration made during the flight of the number of air vehicles (operation 1400). The process trains a machine learning model system using the training dataset to form the air vehicle model system that predicts the acceleration for the air vehicle using the current measurement of the acceleration and the backscatter data (operation 1402). The process terminates thereafter.

Figure 15:
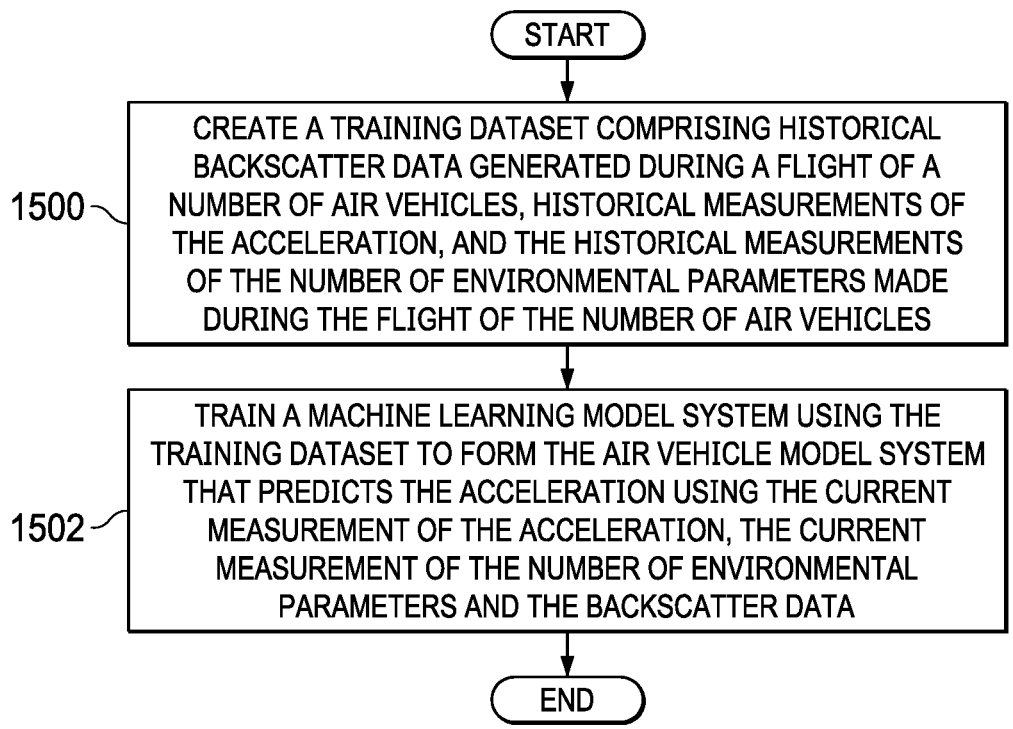
FIG. 15 is an illustration of a flowchart of a process for creating a training dataset in accordance with an illustrative embodiment.

Turning to FIG. 15, an illustration of a flowchart of process for creating a training dataset is depicted in accordance with an illustrative embodiment. The process in FIG. 15 can be implemented in hardware, software, or both. When implemented in software, the process can take the form of program instructions that are run by one or more processor units located in one or more hardware devices in one or more computer systems. For example, the process can be implemented in model generator 400 in FIG. 4.

The process creates a training dataset comprising historical backscatter data generated during a flight of a number of air vehicles, historical measurements of the acceleration, and the historical measurements of the number of environmental parameters made during the flight of the number of air vehicles (operation 1500). The process trains a machine learning model system using the training dataset to form the air vehicle model system that predicts the acceleration using the current measurement of the acceleration, the current measurement of the number of environmental parameters, and the backscatter data (operation 1502). The process terminates thereafter.

Figure 16:
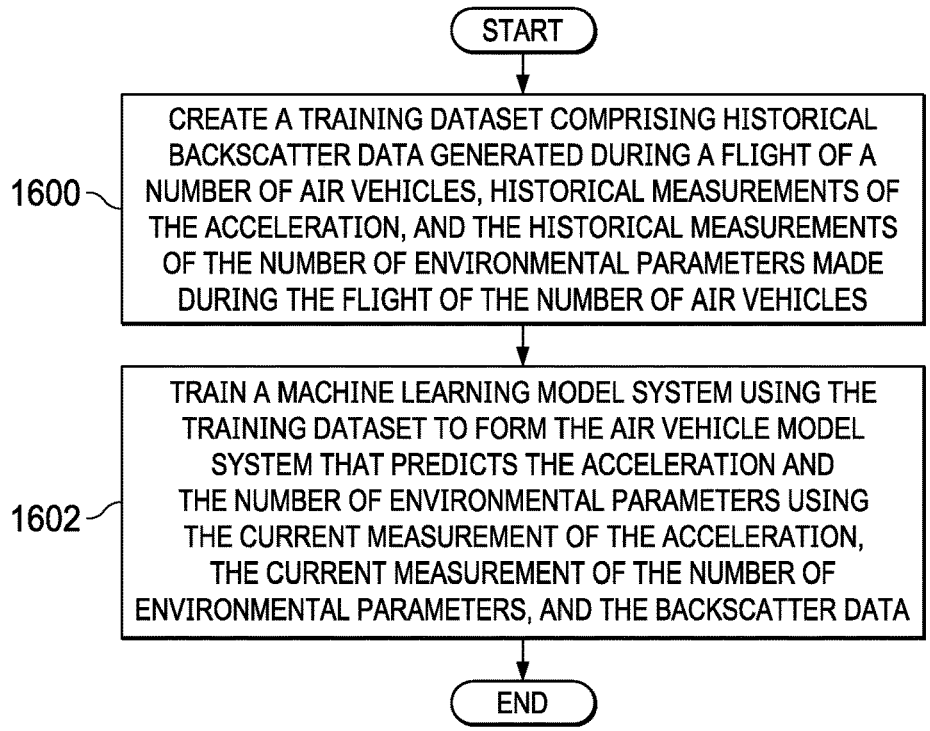
FIG. 16 is an illustration of a flowchart of a process for creating a training dataset in accordance with an illustrative embodiment.

In FIG. 16, an illustration of a flowchart of process for creating a training dataset is depicted in accordance with an illustrative embodiment. The process in FIG. 16 can be implemented in hardware, software, or both. When implemented in software, the process can take the form of program instructions that are run by one of more processor units located in one or more hardware devices in one or more computer systems. For example, the process can be implemented in model generator 400 in FIG. 4.

The process creates a training dataset comprising historical backscatter data generated during a flight of a number of air vehicles, historical measurements of the acceleration, and the historical measurements of the number of environmental parameters made during the flight of the number of air vehicles (operation 1600). The process trains a machine learning model system using the training dataset to form the air vehicle model system that predicts the acceleration and the number of environmental parameters using the current measurement of the acceleration, the current measurement of the number of environmental parameters, and the backscatter data (operation 1602). The process terminates thereafter.

Figure 17:
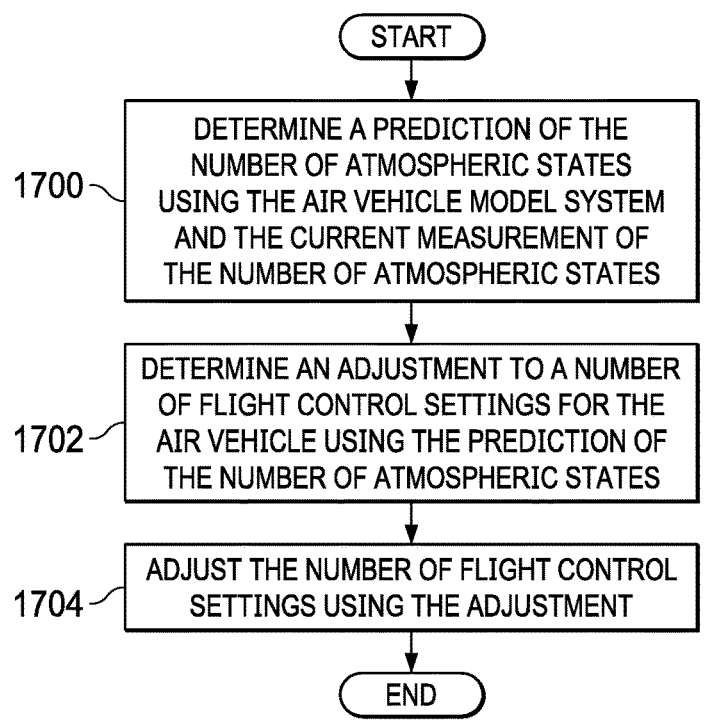
FIG. 17 is an illustration of a flowchart of a process for managing flight controls for an air vehicle in accordance with an illustrative embodiment.

Turning next to FIG. 17, an illustration of a flowchart of a process for managing flight controls for an air vehicle is depicted in accordance with an illustrative embodiment. The process in FIG. 17 can be implemented in hardware, software, or both. When implemented in software, the process can take the form of program instructions that are run by one of more processor units located in one or more hardware devices in one or more computer systems. For example, the process can be implemented in controller 214 in computer system 212 in FIG. 2. In this example, an air vehicle model system has been trained to predict a number of atmospheric states for the air vehicle using a current measurement of the number of atmospheric states.

The process determines a prediction of the number of atmospheric states using the air vehicle model system and the current measurement of the number of atmospheric states (operation 1700). The process determines an adjustment to a number of flight control settings for the air vehicle using the prediction of the number of atmospheric states (operation 1702).

The process adjusts the number of flight control settings using the adjustment (operation 1704). The process terminates thereafter.

In this example process, the number of atmospheric states comprises at least one of a number of environmental parameters or a number of wind conditions. The number of environmental parameters is selected from at least one of a temperature, a pressure, an air density, or a humidity and the number of wind conditions is selected from a wind at a number of distances from the air vehicle.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 18:
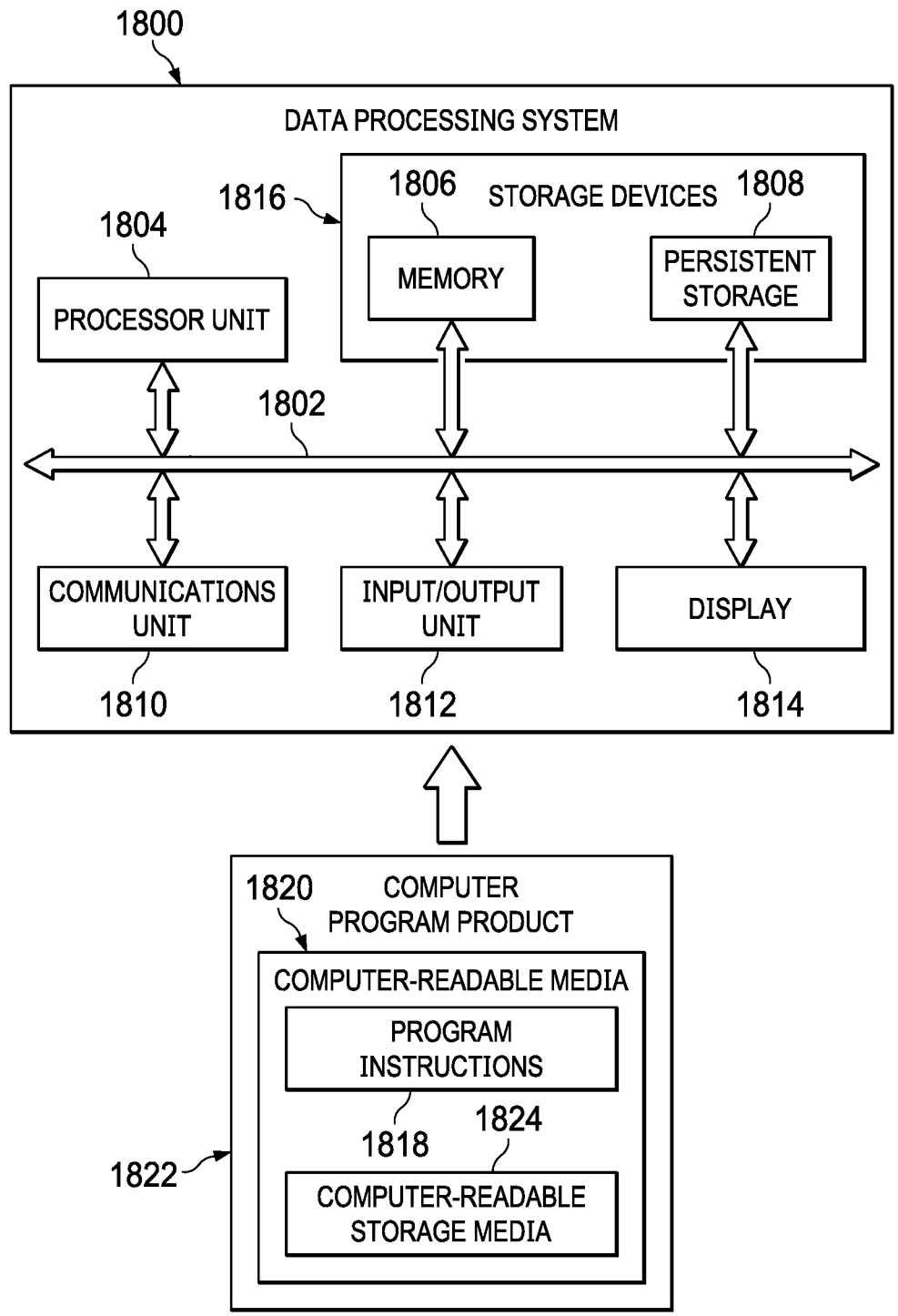
FIG. 18 is an illustration of a block diagram of a data processing system in accordance with an illustrative embodiment.

Turning now to FIG. 18, a block diagram of a data processing system is depicted in accordance with an illustrative embodiment. Data processing system 1800 can be used to implement computer system 212 in FIG. 2. In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 takes the form of a bus system.

Processor unit 1804 serves to execute instructions for software that can be loaded into memory 1806. Processor unit 1804 includes one or more processors. For example, processor unit 1804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1804 can be implemented using one or more heterogeneous processor systems in which a main processor is present with secondary processors on a single chip. As another illustrative example, processor unit 1804 can be a symmetric multi-processor system containing multiple processors of the same type on a single chip.

Memory 1806 and persistent storage 1808 are examples of storage devices 1816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1816 may also be referred to as computer readable storage devices in these illustrative examples. Memory 1806, in these examples, can be, for example, a random-access memory or any other suitable volatile or non-volatile storage device. Persistent storage 1808 may take various forms, depending on the particular implementation.

For example, persistent storage 1808 may contain one or more components or devices. For example, persistent storage 1808 can be a hard drive, a solid-state drive (SSD), a flash memory, a rewritable optical disk, a rewritable magnetic tape, or some combination of the above. The media used by persistent storage 1808 also can be removable. For example, a removable hard drive can be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that can be connected to data processing system 1800. For example, input/output unit 1812 may provide a connection for user input through at least one of a keyboard, a mouse, or some other suitable input device. Further, input/output unit 1812 may send output to a printer. Display 1814 provides a mechanism to display information to a user.

Instructions for at least one of the operating system, applications, or programs can be located in storage devices 1816, which are in communication with processor unit 1804 through communications framework 1802. The processes of the different embodiments can be performed by processor unit 1804 using computer-implemented instructions, which may be located in a memory, such as memory 1806.

These instructions are referred to as program instructions, computer usable program instructions, or computer readable program instructions that can be read and executed by a processor in processor unit 1804. The program instructions in the different embodiments can be embodied on different physical or computer readable storage media, such as memory 1806 or persistent storage 1808.

Program instructions 1818 are located in a functional form on computer readable media 1820 that is selectively removable and can be loaded onto or transferred to data processing system 1800 for execution by processor unit 1804. Program instructions 1818 and computer readable media 1820 form computer program product 1822 in these illustrative examples. In the illustrative example, computer readable media 1820 is computer readable storage media 1824.

Computer readable storage media 1824 is a physical or tangible storage device used to store program instructions 1818 rather than a medium that propagates or transmits program instructions 1818. Computer readable storage media 1824 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 1824, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1818 can be transferred to data processing system 1800 using a computer readable signal media. The computer readable signal media are signals and can be, for example, a propagated data signal containing program instructions 1818. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1820" can be singular or plural. For example, program instructions 1818 can be located in computer readable media 1820 in the form of a single storage device or system. In another example, program instructions 1818 can be located in computer readable media 1820 that is distributed in multiple data processing systems. In other words, some instructions in program instructions 1818 can be located in one data processing system while other instructions in program instructions 1818 can be located in another data processing system. For example, a portion of program instructions 1818 can be located in computer readable media 1820 in a server computer while another portion of program instructions 1818 can be located in computer readable media 1820 located in a set of client computers.

The different components illustrated for data processing system 1800 are not meant to provide architectural limitations to the manner in which different embodiments can be implemented. In some illustrative examples, one or more of the components may be incorporated in or otherwise form a portion of, another component. For example, memory 1806, or portions thereof, may be incorporated in processor unit 1804 in some illustrative examples. The different illustrative embodiments can be implemented in a data processing system including components in addition to or in place of those illustrated for data processing system 1800. Other components shown in FIG. 18 can be varied from the illustrative examples shown. The different embodiments can be implemented using any hardware device or system capable of running program instructions 1818.

Figure 19:
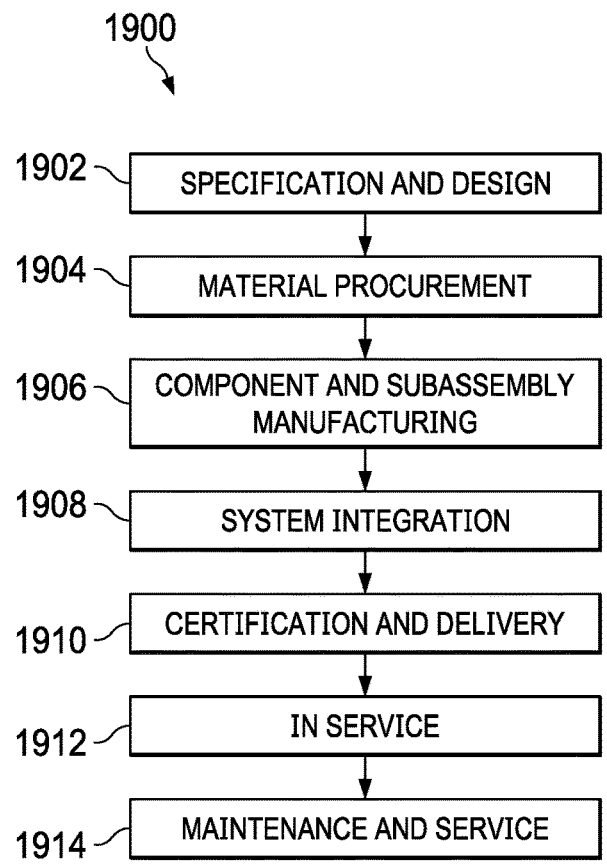
FIG. 19 is an illustration of an aircraft manufacturing and service method in accordance with an illustrative embodiment.
Figure 20:
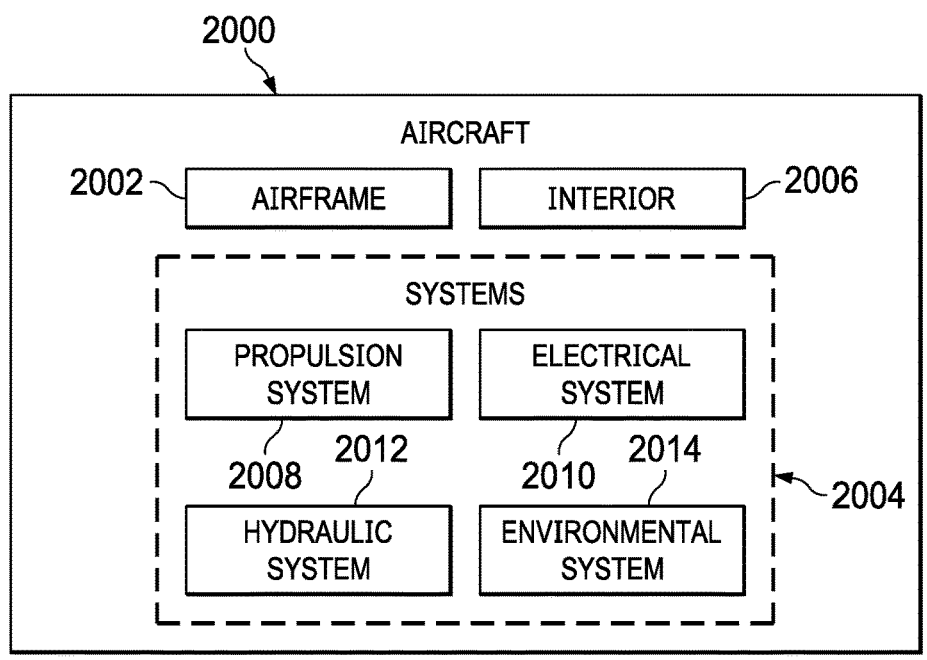
FIG. 20 is an illustration of a block diagram of an aircraft in which an illustrative embodiment may be implemented.

Illustrative embodiments of the disclosure may be described in the context of aircraft manufacturing and service method 1900 as shown in FIG. 19 and aircraft 2000 as shown in FIG. 20. Turning first to FIG. 19, an illustration of an aircraft manufacturing and service method is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 can go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft is depicted in which an illustrative embodiment may be implemented. In this example, aircraft 2000 is produced by aircraft manufacturing and service method 1900 in FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1900 in FIG. 19.

In one illustrative example, components or subassemblies produced in component and subassembly manufacturing 1906 in FIG. 19 can be fabricated or manufactured in a manner similar to components or subassemblies produced while aircraft 2000 is in service 1912 in FIG. 19. As yet another example, one or more apparatus embodiments, method embodiments, or a combination thereof can be utilized during production stages, such as component and subassembly manufacturing 1906 and system integration 1908 in FIG. 19. One or more apparatus embodiments, method embodiments, or a combination thereof may be utilized while aircraft 2000 is in service 1912, during maintenance and service 1914 in FIG. 19, or both. The use of a number of the different illustrative embodiments may substantially expedite the assembly of aircraft 2000, reduce the cost of aircraft 2000, or both expedite the assembly of aircraft 2000 and reduce the cost of aircraft 2000.

Some features of the illustrative examples are described in the following clauses. These clauses are examples of features and are not intended to limit other illustrative examples.

Clause 1.

An air vehicle management system comprising:
a lidar system in an air vehicle, wherein the lidar system is configured to:
emit a laser beam in an atmosphere in a direction ahead of the air vehicle;
receive a backscatter light generated in response to emitting the laser beam; and
generate backscatter data using the backscatter light;
an air vehicle model system trained to predict an acceleration for the air vehicle using a current measurement of an acceleration and the backscatter data; and
a controller configured to:
determine a prediction of the acceleration using the air vehicle model system, the current measurement of the acceleration, and the backscatter data;
determine an adjustment to a number of flight control settings for the air vehicle that reduces a stress on the air vehicle using the prediction of the acceleration; and
adjust the number of flight control settings using the adjustment.

Clause 2

The air vehicle management system of clause 1, wherein in generating the backscatter data, the lidar system is configured to:
filter the backscatter light to remove the backscatter light caused by aerosols in the atmosphere scattering the laser beam in the atmosphere to form filtered backscatter light; and
determine air density fluctuations using the filtered backscatter light to form the backscatter data.

Clause 3

The air vehicle management system of clause 2, wherein the lidar system is configured to filter out the backscatter light having a wavelength of the laser beam.

Clause 4.

The air vehicle management system of clause 1, wherein in generating the backscatter data, the lidar system is configured to:
interfere a portion of the laser beam with the backscatter light to form interfered backscatter light; and determine air speed measurements from the interfered backscatter light to form the backscatter data.

Clause 5.

The air vehicle management system of clause 1, wherein in determining the adjustment, the controller is configured to:
determine an air vehicle type for the air vehicle; and
determine the adjustment to the number of flight control settings that reduces the stress on the air vehicle using the prediction of the acceleration and the air vehicle type.

Clause 6

The air vehicle management system of clause 1, wherein:
the air vehicle model system determines a confidence level of the acceleration predicted for the air vehicle and
in determining the adjustment, the controller is configured to:
determine the adjustment to the number of flight control settings that reduces the stress on the air vehicle using the prediction of the acceleration and the confidence level for the acceleration predicted for the air vehicle.

Clause 7

The air vehicle management system of clause 1, wherein:
the air vehicle model system is further trained to predict the acceleration for the air vehicle using the current measurement of the acceleration, the current measurement of the number of environmental parameters, and the backscatter data; and
the controller is further configured to:
determine the prediction of the acceleration for the air vehicle using the air vehicle model system, the current measurement of the acceleration, the current measurement of the number of environmental parameters, and the backscatter data.

Clause 8

The air vehicle management system of claim 1, wherein:
the air vehicle model system is trained to predict the acceleration for the air vehicle and predict a number of environmental parameters that affect engine performance for the air vehicle using the current measurement of the acceleration, the current measurement of the a of environmental parameters, and the backscatter data,
the controller is further configured to:
determine the prediction of the acceleration and a prediction of a number of environmental parameters for the air vehicle using the air vehicle model system, the current measurement of the acceleration, the current measurement of the number of environmental parameters, and the backscatter data; and
determine the adjustment to a number of flight control settings for the air vehicle that reduces the stress on the air vehicle using the prediction of the acceleration and the prediction of the number of environmental parameters.

Clause 9

The air vehicle management system of clause 1, wherein:
the air vehicle model system is further configured to predict the acceleration for the air vehicle using a number of environmental parameters for the air vehicle; and
the air vehicle model system comprises:
a backscatter machine learning model configured to predict the acceleration using the current measurement of the acceleration and the backscatter data;
a number of environmental machine learning models in which each of the number of environmental machine learning models is configured to predict the acceleration using the current measurement of the acceleration and the current measurement of an environmental parameter in the number of environmental parameters for an environmental machine learning model, wherein backscatter machine learning model and the number of environmental machine learning models output base predictions of the acceleration and confidence levels for the base predictions; and
an aggregator configured to:
determine the prediction of the acceleration using the base predictions of the acceleration and the confidence levels for the base predictions from the backscatter machine learning model and the number of environmental machine learning models.

Clause 10

The air vehicle management system of clause 9, wherein the air vehicle model system further comprises:
an acceleration machine learning model configured to predict the acceleration using the current measurement of the acceleration, wherein the acceleration machine learning model outputs a base prediction of the acceleration and a confidence level for the base prediction.

Clause 11

The air vehicle management system of clause 1 further comprising:
a model generator configured to:
create a training dataset comprising historical backscatter data generated during a flight of a number of air vehicles and historical measurements of the acceleration made during the flight of the number of air vehicles; and
train a machine learning model system using the training dataset to form the air vehicle model system that predicts the acceleration for an air vehicle using the current measurement of the acceleration and the backscatter data.

Clause 12

The air vehicle management system of clause 7 further comprising:
a model generator configured to:
create a training dataset comprising historical backscatter data generated during a flight of a number of air vehicles, historical measurements of the acceleration and the historical measurements of the number of environmental parameters made during the flight of the number of air vehicles; and
train a machine learning model system using the training dataset to form the air vehicle model system that predicts the acceleration using the current measurement of the acceleration, the current measurement of the number of environmental parameters and the backscatter data.

Clause 13

The air vehicle management system of clause 8 further comprising:
a model generator configured to:
create a training dataset comprising historical backscatter data generated during a flight of a number of air vehicles, historical measurements of the acceleration and the historical measurements of the number of environmental parameters made during the flight of the number of air vehicles; and
train a machine learning model system using the training dataset to form the air vehicle model system that predicts the acceleration and the number of environmental parameters using the current measurement of the acceleration, the current measurement of the number of environmental parameters, and the backscatter data.

Clause 14
The air vehicle management system of clause 9 further comprising:
a model generator configured to:
create training datasets comprising historical backscatter data generated during a flight of a number of air vehicles, historical measurements of the acceleration and the historical measurements of the number of environmental parameters made during the flight of the number of air vehicles; and
train a machine learning model system comprising the backscatter machine learning model and the number of environmental machine learning models using the training datasets in which the backscatter machine learning model and the number of environmental machine learning models output base predictions for the acceleration using the current measurement of the acceleration, the current measurement of the number of environmental parameters, and the backscatter data.

Clause 15
The air vehicle management system of clause 11, wherein the historical backscatter data comprises air density fluctuations measured using the backscatter light.

Clause 16
The air vehicle management system of clause 11, wherein the historical backscatter data comprises air speeds measured using the backscatter data generated from interfering the laser beam with the backscatter light.

Clause 17
The air vehicle management system of clause 12, wherein the historical backscatter data comprises air temperature in the number of environmental parameters measured using the backscatter data generated from interfering the laser beam with the backscatter light.

Clause 18
The air vehicle management system of clause 11, wherein the training dataset further includes historical measurements of an acceleration.

Clause 19
The air vehicle management system of clause 11, wherein the machine learning model system is selected from a group comprising a neural network, a recurrent neural network (RNN), a long-term short-term memory (LSTM) network, gated recurrent units (GRUs), a temporal convolutional network (TCN), an echo state network (ESN), a sequence-to-sequence model, a transformer model, a hidden Markov model (HMM), and a time delay neural network (TDNN).

Clause 20
The air vehicle management system of clause 1, wherein the number of flight control settings is selected from at least an engine setting, an engine power output, an angle of attack, an amount of thrust setting, a throttle setting, a fuel flow rate, a flap position, air speed, or an air vehicle acceleration.

Clause 21
The air vehicle management system of clause 1, wherein adjusting the number of flight control settings using the adjustment results in at least one of reduced stress on the air vehicle or increased fuel efficiency.

Clause 22
The air vehicle management system of clause 7, wherein the number of environmental parameters is selected from at least one of a temperature, a pressure, an air density, or a humidity.

Clause 23
The air vehicle management system of clause 1, wherein the air vehicle is selected from a group comprising an aircraft, a commercial airplane, a cargo airplane, a tilt-rotor aircraft, a tilt wing aircraft, a vertical takeoff and landing aircraft, a rotorcraft, an unmanned aerial vehicle, a drone, an electric vertical takeoff and landing vehicle, a personal air vehicle, a spaceplane, and a rocket.

Clause 24
An air vehicle management system comprising:
an air vehicle model system trained to predict a number of atmospheric states for the air vehicle using a current measurement of the number of atmospheric states; and
a controller configured to:
determine a prediction of the number of atmospheric states using the air vehicle model system and the current measurement of number of atmospheric states;
determine an adjustment to a number of flight control settings for the air vehicle using the prediction of the number of atmospheric states; and
adjust the number of flight control settings using the adjustment.

Clause 25
The air vehicle management system of clause 24, wherein the number of atmospheric states comprises at least one of a number of environmental parameters or a number of wind conditions.

Clause 26
The air vehicle management system of clause 24, wherein the number of environmental parameters is selected from at least one of a temperature, a pressure, an air density, or a humidity and the number of wind conditions is selected from a wind at a number of distances from the air vehicle.

Clause 27
An air vehicle management system comprising:
a controller for an air vehicle, wherein the controller is configured to:
determine a prediction of an acceleration using an air vehicle model system and backscatter data, wherein the air vehicle model system is trained to predict the acceleration using the backscatter data generated using backscatter light detected from emitting a laser beam in an atmosphere in a direction ahead of the air vehicle;
determine an adjustment to a number of flight control settings for the air vehicle that reduces a stress on the air vehicle using the prediction of the acceleration; and
adjust the number of flight control settings using the adjustment.

Clause 28
The air vehicle management system of clause 27, wherein in determining the prediction, the controller is further configured to:
determine the prediction of the acceleration using a current measurement of the acceleration and the backscatter data.

Clause 29
The air vehicle management system of clause 27, wherein in determining the prediction, the controller is further configured to:
determine the prediction of the acceleration using a current measurement of number of environmental parameters and the backscatter data.

Clause 30

The air vehicle management system of clause 27, wherein in determining the prediction, the controller is further configured to:
  determine the prediction of the acceleration using the air vehicle model system, a current measurement of the acceleration, the current measurement of a number of environmental parameters, and the backscatter data generated using the backscatter light detected from emitting the laser beam in the atmosphere in the direction ahead of the air vehicle, wherein the air vehicle model system is trained to predict the acceleration using the current measurement of the acceleration, the current measurement of the number of environmental parameters, and the backscatter data.

Clause 31

The air vehicle management system of clause 27 further comprising:
  a lidar system in the air vehicle, wherein the lidar system is configured to:
  emit the laser beam in the atmosphere in the direction ahead of the air vehicle;
  receive the backscatter light generated in response to emitting the laser beam; and
  generate the backscatter data using the backscatter light.

Clause 32

The air vehicle management system of clause 27 further comprising:
  a computer system in the air vehicle, wherein the controller and the air vehicle model system are located in the computer system.

Clause 33

The air vehicle management system of clause 31, wherein in generating the backscatter data, the lidar system is configured to:
  filter the backscatter light to remove the backscatter light caused by aerosols in the atmosphere scattering the laser beam in the atmosphere to form filtered backscatter light; and
  determine air density fluctuations using the filtered backscatter light to form the backscatter data.

Clause 34

The air vehicle management system of clause 31, wherein in generating the backscatter data, the lidar system is configured to:
  interfere a portion of the laser beam with the backscatter light to form interfered backscatter light; and
  determine air speed measurements from the interfered backscatter light to form the backscatter data.

Clause 35

The air vehicle management system of clause 27, wherein the number of flight control settings is selected from at least an engine setting, an engine power output, an angle of attack, an amount of thrust setting, a throttle setting, a fuel flow rate, a flap position, air speed, or an air vehicle acceleration.

Clause 36

An air vehicle management system comprising:
  a computer system, and
  a model generator in the computer system, wherein the model generator is configured to:
  create a training dataset comprising historical backscatter data generated by lidar systems in a number of air vehicles during a flight of the number of air vehicles and historical measurements of acceleration for the number of air vehicles during the flight of the number of air vehicles; and
  train a machine learning model system using the training dataset to form an air vehicle model system that predicts the acceleration for an air vehicle using a current measurement of the acceleration of the air vehicle and the backscatter data generated by a lidar system in the air vehicle.

Clause 37

The air vehicle management system of clause 36, wherein the historical backscatter data comprises air density fluctuations measured using backscatter light generated in response to a laser beam being emitted from an air vehicle.

Clause 38

The air vehicle management system of clause 36, wherein the historical backscatter data comprises air speeds measured using the backscatter data generated from interfering a laser beam emitted from an air vehicle with backscatter light generated in response to the laser beam being emitted from the air vehicle.

Clause 39

The air vehicle management system of clause 36, wherein the machine learning model system is selected from a group comprising a neural network, a recurrent neural network (RNN), a long-term short-term memory (LSTM) network, gated recurrent units (GRUs), a temporal convolutional network (TCN), an echo state network (ESN), a sequence-to-sequence model, a transformer model, a hidden Markov model (HMM), and a time delay neural network (TDNN).

Clause 40

An air vehicle management system comprising:
  a lidar system is located in an air vehicle, wherein the lidar system is configured to:
  emit a laser beam in an atmosphere in a direction ahead of the air vehicle;
  receive a backscatter light generated in response to emitting the laser beam; and
  generate backscatter data using the backscatter light;
  an air vehicle model trained to predict a number of environmental parameters that affect engine performance for the air vehicle using a current measurement of the number of environmental parameters and the backscatter data; and
  a controller configured to:
  determine a prediction of the number of environmental parameters using the air vehicle model, the current measurement of the number of environmental parameters and the backscatter data;
  determine an adjustment to a number of flight control settings for the air vehicle using the prediction of the number of environmental parameters; and
  adjust the number of flight control settings using the adjustment.

Clause 41.

A method for managing flight controls for an air vehicle, the method comprising:
  determining a prediction of an acceleration for the air vehicle using an air vehicle model system, a current measurement of the acceleration and backscatter data, wherein the air vehicle model system is trained to predict acceleration for the air vehicle using the current measurement of the acceleration and the backscatter data;
  determining an adjustment to a number of flight control settings for the air vehicle that reduces a stress on the air vehicle using the prediction of the acceleration; and
  adjusting the number of flight control settings using the adjustment.

Clause 42
  The method of clause 41 further comprising:
    emitting a laser beam in an atmosphere in a direction ahead of the air vehicle;
    receiving a backscatter generated in response to emitting the laser beam; and
    generating the backscatter data using the backscatter light.
Clause 43
  The method of Clause 42, wherein said generating the backscatter data comprises:
    filtering the backscatter light to remove the backscatter light caused by aerosols in the atmosphere scattering the laser beam in the atmosphere to form filtered backscatter light; and
    determining air density fluctuations using the filtered backscatter light to form the backscatter data.
Clause 44
  The method of clause 42, wherein said generating the backscatter data comprises:
    interfering a portion of the laser beam with the backscatter light to form interfered backscatter light; and
    determining air speed measurements from the interfered backscatter light to form the backscatter data.
Clause 45
  The method of clause 41, wherein said determining the adjustment comprises:
    determining an air vehicle type for the air vehicle; and
    determining the adjustment to the number of flight control settings that reduces the stress on the air vehicle using the prediction of the acceleration and the air vehicle type.
Clause 46
  The method of clause 41, wherein:
    the air vehicle model system determines a confidence level of the acceleration predicted for the air vehicle; and
    said determining the adjustment comprises:
      determining the adjustment to the number of flight control settings that reduces the stress on the air vehicle using the prediction of the acceleration and the confidence level for the acceleration predicted for the air vehicle.
Clause 47
  The method of clause 41, wherein:
    the air vehicle model system is trained to predict the acceleration for the air vehicle using the current measurement of the acceleration, a current measurement of a number of environmental parameters, and the backscatter data; and
    said determining the prediction comprises:
    determining the prediction of the acceleration for the air vehicle using the air vehicle model system, the current measurement of the acceleration, the current measurement of the number of environmental parameters, and the backscatter data; and
    said determining the adjustment comprises:
    determining the adjustment to a number of flight control settings for the air vehicle that reduces the stress on the air vehicle using the prediction of the acceleration.
Clause 48
  The method of clause 41, wherein:
    the air vehicle model system is trained to predict the acceleration for the air vehicle and the number of environmental parameters that affect engine performance for the air vehicle using the current measurement of the acceleration, the current measurement of the number of environmental parameters, and the backscatter data;
    said determining the prediction comprises:
    determining a prediction of the acceleration and the number of environmental parameters for the air vehicle using the air vehicle model system, the current measurement of the acceleration, the current measurement of the number of environmental parameters, and the backscatter data; and
    said determining the adjustment comprises:
    determining the adjustment to a number of flight control settings for the air vehicle that reduces the stress on the air vehicle using the prediction of the acceleration and the prediction of the number of environmental parameters.
Clause 49
  The method of clause 41 further comprising:
    creating a training dataset comprising historical backscatter data generated during a flight of a number of air vehicles, historical measurements of the acceleration made during the flight of the number of air vehicles; and
    training a machine learning model system using the training dataset to form the air vehicle model system that predicts the acceleration for the air vehicle using the current measurement of the acceleration and the backscatter data.
Clause 50
  The method of clause 47 further comprising:
    creating a training dataset comprising historical backscatter data generated during a flight of a number of air vehicles, historical measurements of the acceleration and the historical measurements of the number of environmental parameters made during the flight of the number of air vehicles; and
    training a machine learning model system using the training dataset to form the air vehicle model system that predicts the acceleration using the current measurement of the acceleration, the current measurement of the number of environmental parameters and the backscatter data.
Clause 51
  The method of clause 48 further comprising:
    creating a training dataset comprising historical backscatter data generated during a flight of a number of air vehicles, historical measurements of the acceleration and the historical measurements of the number of environmental parameters made during the flight of the number of air vehicles; and
    training a machine learning model system using the training dataset to form the air vehicle model system that predicts the acceleration and the number of environmental parameters using the current measurement of the acceleration, the current measurement of the number of environmental parameters, and the backscatter data.
Clause 52
  A computer program product for managing flight controls, the computer program product comprising a computer readable storage medium having program instructions embodied therewith, the program instructions executable by a computer system to cause the computer system to perform a method of:
    determining a prediction of an acceleration an air vehicle using an air vehicle model system, a current measurement of the acceleration and backscatter data, wherein the air vehicle model system is trained to predict acceleration for the air vehicle using the current measurement of the acceleration and the backscatter data;

determining an adjustment to a number of flight control settings for the air vehicle that reduces a stress on the air vehicle using the prediction of the acceleration; and adjusting the number of flight control settings using the adjustment.

The illustrative examples provide a method, apparatus, system, and computer program product for managing an air vehicle. In illustrative examples, an air vehicle management system comprises a controller for an air vehicle. The controller is configured to determine a prediction of an acceleration using an air vehicle model system, a current measurement of the acceleration and backscatter data. The air vehicle model system is trained to predict the acceleration using the current measurement of the acceleration and the backscatter data is generated using backscatter light detected from emitting a laser beam in an atmosphere in a direction ahead of the air vehicle. The controller is configured to determine an adjustment to a number of flight control settings for the air vehicle that reduces a stress on the air vehicle using the prediction of the acceleration. The controller is configured to adjust the number of flight control settings using the adjustment. The illustrative examples provide an ability to manage flight control settings in an air vehicle in a manner that provides a reduction in acceleration actually encountered as compared to the predicted acceleration which reduces stress on aircraft. One or more illustrative examples also increase engine performance in a manner that increases fuel efficiency that produces the emission of greenhouse gases. Additionally, one or more illustrative examples can also increase passenger comfort. Further, one or more technical solutions can enable designing an air vehicle that has a lighter weight with the same lifecycle as compared to a current air vehicle but does not use one or more illustrative examples to manage flight control settings.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes," "including," "has," "contains," and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An air vehicle management system comprising:
   a lidar system in an air vehicle, wherein the lidar system is configured to:
      emit a laser beam in an atmosphere in a direction ahead of the air vehicle;
      receive a backscatter light generated in response to emitting the laser beam; and
      generate backscatter data using the backscatter light;
   an air vehicle model system trained to predict an acceleration for the air vehicle using a current measurement of the acceleration and the backscatter data; and
   a controller configured to:
      determine a prediction of the acceleration using the air vehicle model system, the current measurement of the acceleration, and the backscatter data;
      determine an adjustment to a number of flight control settings for the air vehicle that reduces a stress on the air vehicle using the prediction of the acceleration; and
      adjust the number of flight control settings using the adjustment.

2. The air vehicle management system of claim 1, wherein in determining the adjustment, the controller is further configured to:
   determine an air vehicle type for the air vehicle; and
   determine the adjustment to the number of flight control settings that reduces the stress on the air vehicle using the prediction of the acceleration and the air vehicle type.

3. The air vehicle management system of claim 1, wherein:
   the air vehicle model system determines a confidence level of the acceleration predicted for the air vehicle; and
   in determining the adjustment, the controller is configured to:
      determine the adjustment to the number of flight control settings that reduces the stress on the air vehicle using the prediction of the acceleration and the confidence level for the acceleration predicted for the air vehicle.

4. The air vehicle management system of claim 1, wherein:
   the air vehicle model system is further trained to predict the acceleration for the air vehicle using a current measurement of a number of environmental parameters; and
   the controller is further configured to:
      determine the prediction of the acceleration for the air vehicle using the air vehicle model system, the current measurement of the acceleration, the current measurement of the number of environmental parameters, and the backscatter data.

5. The air vehicle management system of claim 1, wherein:
   the air vehicle model system is trained to predict the acceleration for the air vehicle and predict a number of environmental parameters that affect engine performance for the air vehicle using the current measurement of the acceleration, a current measurement of a number of environmental parameters, and the backscatter data; and
   the controller is further configured to:
      determine the prediction of the acceleration and a prediction of a number of environmental parameters for the air vehicle using the air vehicle model system, the current measurement of the acceleration, the current measurement of the number of environmental parameters, and the backscatter data; and determine the adjustment to a number of flight control settings for the air vehicle that reduces the stress on the air vehicle using the prediction of the acceleration and the prediction of the number of environmental parameters.

6. The air vehicle management system of claim 1, wherein:
the air vehicle model system is further configured to predict the acceleration for the air vehicle using a number of environmental parameters for the air vehicle; and
the air vehicle model system comprises:
a backscatter machine learning model configured to predict the acceleration using the current measurement of the acceleration and the backscatter data;
a number of environmental machine learning models in which each of the number of environmental machine learning models is configured to predict the acceleration using the current measurement of the acceleration and the current measurement of an environmental parameter in the number of environmental parameters for an environmental machine learning model, wherein the backscatter machine learning model and the number of environmental machine learning models output base predictions of the acceleration and confidence levels for the base predictions; and
an aggregator configured to:
determine the prediction of the acceleration using the base predictions of the acceleration and the confidence levels for the base predictions from the backscatter machine learning model and the number of environmental machine learning models.

7. The air vehicle management system of claim 6, wherein the air vehicle model system further comprises:
an acceleration machine learning model configured to predict the acceleration using the current measurement of the acceleration, wherein the acceleration machine learning model outputs a base prediction of the acceleration and a confidence level for the base prediction.

8. The air vehicle management system of claim 1, further comprising:
a model generator configured to:
create a training dataset comprising historical backscatter data generated during a flight of a number of air vehicles and historical measurements of the acceleration made during the flight of the number of air vehicles; and
train a machine learning model system using the training dataset to form the air vehicle model system that predicts the acceleration for an air vehicle using the current measurement of the acceleration and the backscatter data.

9. The air vehicle management system of claim 4, further comprising:
a model generator configured to:
create a training dataset comprising historical backscatter data generated during a flight of a number of air vehicles, historical measurements of the acceleration, and the historical measurements of the number of environmental parameters made during the flight of the number of air vehicles; and
train a machine learning model system using the training dataset to form the air vehicle model system that predicts the acceleration using the current measurement of the acceleration, the current measurement of the number of environmental parameters, and the backscatter data.

10. The air vehicle management system of claim 5, further comprising:
a model generator configured to:
create a training dataset comprising historical backscatter data generated during a flight of a number of air vehicles, historical measurements of the acceleration, and the historical measurements of the number of environmental parameters made during the flight of the number of air vehicles; and
train a machine learning model system using the training dataset to form the air vehicle model system that predicts the acceleration and predicts the number of environmental parameters using the current measurement of the acceleration, the current measurement of the number of environmental parameters, and the backscatter data.

11. The air vehicle management system of claim 6, further comprising:
a model generator configured to:
create training datasets comprising historical backscatter data generated during a flight of a number of air vehicles, historical measurements of the acceleration, and the historical measurements of the number of environmental parameters made during the flight of the number of air vehicles; and
train a machine learning model system comprising the backscatter machine learning model and the number of environmental machine learning models using the training datasets in which the backscatter machine learning model and the number of environmental machine learning models output base predictions for the acceleration using the current measurement of the acceleration, the current measurement of the number of environmental parameters, and the backscatter data.

12. The air vehicle management system of claim 11, wherein the machine learning model system is selected from a group comprising a neural network, a recurrent neural network (RNN), a long-term short-term memory (LSTM) network, gated recurrent units (GRUs), a temporal convolutional network (TCN), an echo state network (ESN), a sequence-to-sequence model, a transformer model, a hidden Markov model (HMM), and a time delay neural network (TDNN).

13. The air vehicle management system of claim 1, wherein the number of flight control settings is selected from at least an engine setting, an engine power output, an angle of attack, an amount of thrust setting, a throttle setting, a fuel flow rate, a flap position, air speed, or an air vehicle acceleration.

14. The air vehicle management system of claim 1, wherein adjusting the number of flight control settings using the adjustment results in at least one of reduced stress on the air vehicle or increased fuel efficiency.

15. The air vehicle management system of claim 4, wherein the number of environmental parameters is selected from at least one of a temperature, a pressure, an air density, or a humidity.

16. The air vehicle management system of claim 1, wherein the air vehicle is selected from a group comprising an aircraft, a commercial airplane, a cargo airplane, a tilt-rotor aircraft, a tilt wing aircraft, a vertical takeoff and landing aircraft, a rotorcraft, an unmanned aerial vehicle, a drone, an electric vertical takeoff and landing vehicle, a personal air vehicle, a spaceplane, and a rocket.

17. An air vehicle management system comprising:
an air vehicle model system trained to predict a number of atmospheric states for the air vehicle using a current measurement of the number of atmospheric states; and
a controller configured to:
determine a prediction of the number of atmospheric states using the air vehicle model system and the current measurement of number of atmospheric states;
determine an adjustment to a number of flight control settings for the air vehicle using the prediction of the number of atmospheric states; and
adjust the number of flight control settings using the adjustment.

18. The air vehicle management system of claim 17, wherein the number of atmospheric states comprises at least one of a number of environmental parameters or a number of wind conditions.

19. The air vehicle management system of claim 18, wherein the number of environmental parameters is selected from at least one of a temperature, a pressure, an air density, or a humidity, and wherein the number of wind conditions is selected from a wind at a number of distances from the air vehicle.

20. An air vehicle management system comprising:
a controller for an air vehicle, wherein the controller is configured to:
determine a prediction of an acceleration using an air vehicle model system and backscatter data, wherein the air vehicle model system is trained to predict the acceleration using the backscatter data generated using backscatter light detected from emitting a laser beam in an atmosphere in a direction ahead of the air vehicle;
determine an adjustment to a number of flight control settings for the air vehicle that reduces a stress on the air vehicle using the prediction of the acceleration; and
adjust the number of flight control settings using the adjustment.

21. The air vehicle management system of claim 20, wherein in determining the prediction, the controller is further configured to:
determine the prediction of the acceleration using a current measurement of the acceleration.

22. The air vehicle management system of claim 20, wherein in determining the prediction, the controller is further configured to:
determine the prediction of the acceleration using a current measurement of a number of environmental parameters.

23. An air vehicle management system comprising:
a computer system; and
a model generator in the computer system, wherein the model generator is configured to:
create a training dataset comprising historical backscatter data generated by lidar systems in a number of air vehicles during a flight of the number of air vehicles and historical measurements of acceleration for the number of air vehicles during the flight of the number of air vehicles; and
train a machine learning model system using the training dataset to form an air vehicle model system that predicts an acceleration for an air vehicle using a current measurement of the acceleration of the air vehicle and the backscatter data generated by a lidar system in the air vehicle.

24. The air vehicle management system of claim 23, wherein the historical backscatter data comprises air density fluctuations measured using backscatter light generated in response to a laser beam being emitted from an air vehicle.

25. The air vehicle management system of claim 23, wherein the historical backscatter data comprises air speeds measured using the backscatter data generated from interfering a laser beam emitted from an air vehicle with backscatter light generated in response to the laser beam being emitted from the air vehicle.

26. A method for managing flight controls for an air vehicle, the method comprising:
determining a prediction of an acceleration for the air vehicle using an air vehicle model system, a current measurement of the acceleration, and backscatter data, wherein the air vehicle model system is trained to predict acceleration for the air vehicle using the current measurement of the acceleration and the backscatter data;
determining an adjustment to a number of flight control settings for the air vehicle that reduces a stress on the air vehicle using the prediction of the acceleration; and
adjusting the number of flight control settings using the adjustment.

27. The method of claim 26, wherein said determining the adjustment further comprises:
determining an air vehicle type for the air vehicle; and
determining the adjustment to the number of flight control settings that reduces the stress on the air vehicle using the prediction of the acceleration and the air vehicle type.

28. The method of claim 26, wherein:
the air vehicle model system determines a confidence level of the acceleration predicted for the air vehicle; and
said determining the adjustment further comprises:
determining the adjustment to the number of flight control settings that reduces the stress on the air vehicle using the prediction of the acceleration and the confidence level for the acceleration predicted for the air vehicle.

29. The method of claim 26, wherein:
the air vehicle model system is trained to predict the acceleration for the air vehicle using a current measurement of the acceleration, a current measurement of a number of environmental parameters, and the backscatter data; and
said determining the prediction comprises:
determining the prediction of the acceleration for the air vehicle using the air vehicle model system, the current measurement of the acceleration, the current measurement of the number of environmental parameters, and the backscatter data.

30. The method of claim 26, wherein:
the air vehicle model system is trained to predict the acceleration for the air vehicle and predict a number of environmental parameters that affect engine performance for the air vehicle using a current measurement of the acceleration, a current measurement of a number of environmental parameters, and the backscatter data;
said determining the prediction comprises:
determining the prediction of the acceleration and a prediction of a number of environmental parameters for the air vehicle using the air vehicle model system, the current measurement of the acceleration, the current measurement of the number of environmental parameters, and the backscatter data; and said determining the adjustment comprises:
  determining the adjustment to a number of flight control settings for the air vehicle that reduces the stress on the air vehicle using the prediction of the acceleration and the prediction of the number of environmental parameters.

31. The method of claim 26, further comprising:
creating a training dataset comprising historical backscatter data generated during a flight of a number of air vehicles and historical measurements of the acceleration made during the flight of the number of air vehicles; and training a machine learning model system using the training dataset to form the air vehicle model system that predicts the acceleration for the air vehicle using the current measurement of the acceleration and the backscatter data.

32. The method of claim 29, further comprising:
creating a training dataset comprising historical backscatter data generated during a flight of a number of air vehicles, historical measurements of the acceleration, and the historical measurements of the number of environmental parameters made during the flight of the number of air vehicles; and training a machine learning model system using the training dataset to form the air vehicle model system that predicts the acceleration using the current measurement of the acceleration, the current measurement of the number of environmental parameters, and the backscatter data.

33. The method of claim 30, further comprising:
creating a training dataset comprising historical backscatter data generated during a flight of a number of air vehicles, historical measurements of the acceleration, and the historical measurements of the number of environmental parameters made during the flight of the number of air vehicles; and training a machine learning model system using the training dataset to form the air vehicle model system that predicts the acceleration and predicts the number of environmental parameters using the current measurement of the acceleration, the current measurement of the number of environmental parameters, and the backscatter data.

* * * * *